(12) United States Patent
Kung et al.

(10) Patent No.: US 12,156,263 B2
(45) Date of Patent: Nov. 26, 2024

(54) METHOD AND APPARATUS FOR OBTAINING TIME ALIGNMENT REGARDING MULTIPLE TRPS IN A WIRELESS COMMUNICATION SYSTEM

(71) Applicant: ASUSTek Computer Inc., Taipei (TW)

(72) Inventors: Yi-Hsuan Kung, Taipei (TW);
Yu-Hsuan Guo, Taipei (TW);
Chun-Wei Huang, Taipei (TW)

(73) Assignee: ASUSTek Computer Inc., Taipei (TW)

( * ) Notice: Subject to any disclaimer, the term of this patent is extended or adjusted under 35 U.S.C. 154(b) by 0 days.

(21) Appl. No.: 17/866,055

(22) Filed: Jul. 15, 2022

(65) Prior Publication Data
US 2023/0284287 A1    Sep. 7, 2023

Related U.S. Application Data

(60) Provisional application No. 63/231,545, filed on Aug. 10, 2021, provisional application No. 63/226,155, (Continued)

(51) Int. Cl.
*H04W 56/00* (2009.01)
*H04W 74/04* (2009.01)
(Continued)

(52) U.S. Cl.
CPC ..... *H04W 74/0841* (2013.01); *H04W 56/004* (2013.01); *H04W 74/04* (2013.01); *H04W 74/0891* (2013.01)

(58) Field of Classification Search
CPC . H04W 56/0045; H04W 56/00; H04W 16/28; H04W 84/04; H04W 88/08;
(Continued)

(56) References Cited

U.S. PATENT DOCUMENTS 10,660,063 B2 *   5/2020  Park ...................... H04L 1/0026
11,129,182 B2 *   9/2021  Huang .............. H04W 56/0045
(Continued)

FOREIGN PATENT DOCUMENTS

EP         3952567 A1       2/2022
WO     WO-2020252174 A1 * 12/2020 ........... H04L 1/1812
WO     WO-2022130207 A1 *  6/2022

OTHER PUBLICATIONS

3GPP TS 38.321 V16.5.0 (Jun. 2021)Technical Specification to 3rd Generation Partnership Project; Technical Specification Group Radio Access Network; Jun. 2021. (Year: 2021).*
(Continued)

*Primary Examiner* — Nathan S Taylor
(74) *Attorney, Agent, or Firm* — Skaar Ulbrich Macari, P.A.

(57) ABSTRACT

Methods, systems, and apparatuses are provided for enhancing timing alignment for uplink (UL) multi-Transmission/Reception Point (TRP) (or mTRP) scenarios in a wireless communication system. A method for a UE in a wireless communication system can comprise receiving a signaling, wherein the signaling indicates activation for a first TRP and/or is a Physical Downlink Control Channel (PDCCH) signal, determining to perform a first random access procedure on the first TRP, based on the signaling, to obtain a first Time Alignment (TA) information associated with the first TRP, and performing multi-TRP operation on the first TRP associated with the first TA information and a second TRP associated with a second TA information.

20 Claims, 16 Drawing Sheets

Related U.S. Application Data filed on Jul. 27, 2021, provisional application No. 63/226,161, filed on Jul. 27, 2021.

(51) Int. Cl.
*H04W 74/08* (2024.01)
*H04W 74/0833* (2024.01)

(58) Field of Classification Search
CPC ......... H04W 74/0833; H04W 74/0841; H04W 76/20; H04W 76/27; H04W 56/0005; H04W 72/1268; H04W 72/23; H04W 74/002; H04W 72/12; H04W 74/00
See application file for complete search history.

(56) References Cited

U.S. PATENT DOCUMENTS

| | | | |
|---|---|---|---|
| 2016/0302246 A1* | 10/2016 | Chervyakov | H04L 27/2665 |
| 2017/0070985 A1* | 3/2017 | Uchino | H04B 7/022 |
| 2017/0238268 A1* | 8/2017 | Yang | H04W 72/0446 370/329 |
| 2017/0290014 A1* | 10/2017 | Kim | H04W 48/12 |
| 2018/0192400 A1* | 7/2018 | Wei | H04W 28/04 |
| 2019/0149365 A1* | 5/2019 | Chatterjee | H04L 25/0226 370/329 |
| 2019/0174466 A1* | 6/2019 | Zhang | H04L 5/0057 |
| 2019/0222364 A1* | 7/2019 | Shimoda | H04W 74/0833 |
| 2019/0281587 A1* | 9/2019 | Zhang | H04W 72/23 |
| 2020/0053752 A1* | 2/2020 | Huang | H04W 56/0045 |
| 2020/0204312 A1* | 6/2020 | Xu | H04W 36/0055 |
| 2020/0314858 A1* | 10/2020 | Xu | H04L 5/0055 |
| 2020/0351129 A1* | 11/2020 | Kwak | H04W 72/53 |
| 2020/0351730 A1* | 11/2020 | Park | H04W 56/0045 |
| 2020/0351841 A1* | 11/2020 | Cirik | H04W 48/08 |
| 2021/0028843 A1* | 1/2021 | Zhou | H04B 7/063 |
| 2021/0168900 A1* | 6/2021 | Jang | H04L 5/0094 |
| 2022/0085931 A1* | 3/2022 | Mondal | H04W 72/044 |
| 2022/0191849 A1* | 6/2022 | Yoon | H04W 72/044 |
| 2022/0217032 A1* | 7/2022 | Ko | H04L 27/26025 |
| 2022/0312246 A1* | 9/2022 | He | H04W 36/0058 |
| 2022/0322358 A1* | 10/2022 | Zhou | H04W 72/21 |
| 2022/0338264 A1* | 10/2022 | Ko | H04W 74/004 |
| 2022/0369299 A1* | 11/2022 | Cirik | H04B 7/088 |
| 2022/0417909 A1* | 12/2022 | Zhu | H04L 5/0023 |
| 2023/0164702 A1* | 5/2023 | Lee | H04W 52/32 455/522 |
| 2023/0216565 A1* | 7/2023 | Kwak | H04B 7/0695 375/267 |
| 2023/0276389 A1* | 8/2023 | Ko | H04W 56/0005 370/350 |

OTHER PUBLICATIONS

3GPP TSG RAN Meeting #86 RP-193133;"New WID: Further enhancements on MIMO for NR" to Samsung; Sitges, Spain, ; Dec. 9-12, 2019; (Year: 2019).*

* cited by examiner

| | | | | | | | | |
|---|---|---|---|---|---|---|---|---|
| CORE SET Pool ID | Serving Cell ID | | | | | BWP ID | | Oct 1 |
| $T_7$ | $T_6$ | $T_5$ | $T_4$ | $T_3$ | $T_2$ | $T_1$ | $T_0$ | Oct 2 |
| $T_{15}$ | $T_{14}$ | $T_{13}$ | $T_{12}$ | $T_{11}$ | $T_{10}$ | $T_9$ | $T_8$ | Oct 3 |
| ... | | | | | | | | |
| $T_{(N-2)\times8+7}$ | $T_{(N-2)\times8+6}$ | $T_{(N-2)\times8+5}$ | $T_{(N-2)\times8+4}$ | $T_{(N-2)\times8+3}$ | $T_{(N-2)\times8+2}$ | $T_{(N-2)\times8+1}$ | $T_{(N-2)\times8}$ | Oct N |

FIG. 8 (Prior Art)

| | | | |
|---|---|---|---|
| R | Serving Cell ID | BWP ID | Oct 1 |
| $C_0$ | TCI state $ID_{0,1}$ | | Oct 2 |
| R | TCI state $ID_{0,2}$ | | Oct 3 (Optional) |
| ... | | | |
| $C_N$ | TCI state $ID_{N,1}$ | | Oct M-1 |
| R | TCI state $ID_{N,2}$ | | Oct M (Optional) |

FIG. 9 (Prior Art)

| TAG ID_1 | TAC_TRP1 |
|---|---|
| TAG ID_2 | TAC_TRP2 |

| R | TAG ID or non-serving cell ID or PCI |
|---|---|
| TAC_non-serving cell ||

| R | Second TRP (information) |
|---|---|
| Offset_TRP2 | |

FIG. 14B

| TAG ID_P | TAC_TRP1 |
|---|---|
| | Offset_1 or TAC_TRP2 |

FIG. 15A

| TAG ID_P | TAC_TRP1 |
|---|---|
| Non-serving cell id1 | Offset_1 or TAC_TRP2 |

FIG. 15B

| TAG ID_P | TAC_TRP1 |
|---|---|
| Non-serving cell id1 | Offset_1 or TAC_TRP2 |
| Non-serving cell id2 | Offset_2 or TAC_TRP3 |

FIG. 15C

| Non-serving cell id1 | Offset_1 or TAC_TRP1 |
|---|---|
| Non-serving cell id2 | Offset_2 or TAC_TRP2 |

FIG. 15D

METHOD AND APPARATUS FOR OBTAINING TIME ALIGNMENT REGARDING MULTIPLE TRPS IN A WIRELESS COMMUNICATION SYSTEM

CROSS-REFERENCE TO RELATED APPLICATIONS

The present Application claims priority to and the benefit of U.S. Provisional Patent Application Ser. No. 63/226,155, filed Jul. 27, 2021, U.S. Provisional Patent Application Ser. No. 63/226,161, filed Jul. 27, 2021, and U.S. Provisional Patent Application Ser. No. 63/231,545, filed Aug. 10, 2021; with each of the referenced applications and disclosures fully incorporated herein by reference.

FIELD

This disclosure generally relates to wireless communication networks and, more particularly, to a method and apparatus for enhancing timing alignment for uplink (UL) multi-Transmission/Reception Point (TRP) (or mTRP) scenarios in a wireless communication system.

BACKGROUND

With the rapid rise in demand for communication of large amounts of data to and from mobile communication devices, traditional mobile voice communication networks are evolving into networks that communicate with Internet Protocol (IP) data packets. Such IP data packet communication can provide users of mobile communication devices with voice over IP, multimedia, multicast and on-demand communication services.

An exemplary network structure is an Evolved Universal Terrestrial Radio Access Network (E-UTRAN). The E-UTRAN system can provide high data throughput in order to realize the above-noted voice over IP and multimedia services. A new radio technology for the next generation (e.g., 5G) is currently being discussed by the 3GPP standards organization. Accordingly, changes to the current body of 3GPP standard are currently being submitted and considered to evolve and finalize the 3GPP standard.

SUMMARY

Methods, systems, and apparatuses are provided for enhancing timing alignment for uplink (UL) multi-Transmission/Reception Point (TRP) (or mTRP) scenarios in a wireless communication system.

In various embodiments, with this and other concepts, systems, and methods of the present invention, a method for a UE in a wireless communication system comprises receiving a signaling, wherein the signaling indicates activation for a first Transmission/Reception Point (TRP) and/or is a Physical Downlink Control Channel (PDCCH) signal, determining to perform a first random access procedure on the first TRP, based on the signaling, to obtain a first Time Alignment (TA) information associated with the first TRP, and performing multi-TRP operation on the first TRP associated with the first TA information and a second TRP associated with a second TA information.

BRIEF DESCRIPTION OF THE DRAWINGS

FIG. 8 is a reproduction of FIG. 6.1.3.14-1 of 3GPP TS 38.321, V16.5.0: TCI States Activation/Deactivation for UE-specific PDSCH MAC CE.

FIG. 9 is a reproduction of FIG. 6.1.3.24-1 of 3GPP TS 38.321, V16.5.0: Enhanced TCI States Activation/Deactivation for UE-specific PDSCH MAC CE.

FIG. 12 is a reproduction of FIG. 4.3.1-1 of 3GPP TS 38.211, V16.6.0: Uplink-downlink timing relation.

FIG. 13 is an example of an extended TAC MAC CE, in accordance with embodiments of the present invention.

FIGS. 14A and 14B are examples of an extended TAC MAC CE for a non-serving cell, in accordance with embodiments of the present invention.

FIG. 15A is another example of an extended TAC MAC CE, in accordance with embodiments of the present invention.

FIG. 15B is an example wherein a MAC CE could contain a non-serving cell ID and a UE applies the Offset1 or TAC_TRP2 to the non-serving cell associated with Non-serving cell id1, in accordance with embodiments of the present invention.

FIG. 15C is an example wherein a MAC CE could contain more than one offset or TAC for non-serving cells, in accordance with embodiments of the present invention.

FIG. 15D is another example wherein a MAC CE could contain more than one offset or TAC for non-serving cells, in accordance with embodiments of the present invention.

DETAILED DESCRIPTION

The invention described herein can be applied to or implemented in exemplary wireless communication systems and devices described below. In addition, the invention is described mainly in the context of the 3GPP architecture reference model. However, it is understood that with the disclosed information, one skilled in the art could easily adapt for use and implement aspects of the invention in a 3GPP2 network architecture as well as in other network architectures.

The exemplary wireless communication systems and devices described below employ a wireless communication system, supporting a broadcast service. Wireless communication systems are widely deployed to provide various types of communication such as voice, data, and so on. These systems may be based on code division multiple access (CDMA), time division multiple access (TDMA), orthogonal frequency division multiple access (OFDMA), 3GPP LTE (Long Term Evolution) wireless access, 3GPP LTE-A (Long Term Evolution Advanced) wireless access, 3GPP2 UMB (Ultra Mobile Broadband), WiMax, 3GPP NR (New Radio), or some other modulation techniques.

In particular, the exemplary wireless communication systems and devices described below may be designed to support one or more standards such as the standard offered by a consortium named "3rd Generation Partnership Project" referred to herein as 3GPP, including: [1] RP-193133 New WID: Further enhancements on MIMO for NR; [2] 3GPP TS 38.213, V16.6.0; [3] 3GPP TS 38.321, V16.5.0; [4] 3GPP TS 38.331, v16.5.0; [5] 3GPP TS 38.211, V16.6.0; and [6] 3GPP TS 38.212, V16.6.0. The standards and documents listed above are hereby expressly and fully incorporated herein by reference in their entirety.

Figure 1:
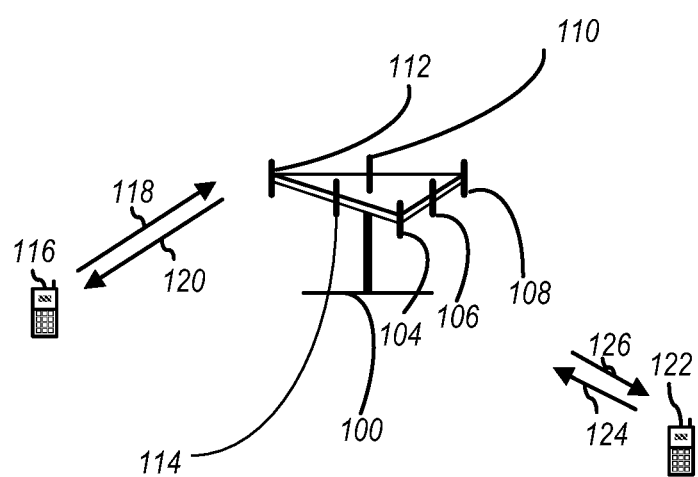
FIG. 1 shows a diagram of a wireless communication system, in accordance with embodiments of the present invention.

FIG. 1 shows a multiple access wireless communication system according to one embodiment of the invention. An access network 100 (AN) includes multiple antenna groups, one including 104 and 106, another including 108 and 110, and an additional including 112 and 114. In FIG. 1, only two antennas are shown for each antenna group, however, more or fewer antennas may be utilized for each antenna group. Access terminal (AT) 116 is in communication with antennas 112 and 114, where antennas 112 and 114 transmit information to access terminal 116 over forward link 120 and receive information from AT 116 over reverse link 118. AT 122 is in communication with antennas 106 and 108, where antennas 106 and 108 transmit information to AT 122 over forward link 126 and receive information from AT 122 over reverse link 124. In a FDD system, communication links 118, 120, 124 and 126 may use different frequency for communication. For example, forward link 120 may use a different frequency than that used by reverse link 118.

Each group of antennas and/or the area in which they are designed to communicate is often referred to as a sector of the access network. In the embodiment, antenna groups each are designed to communicate to access terminals in a sector of the areas covered by access network 100.

In communication over forward links 120 and 126, the transmitting antennas of access network 100 may utilize beamforming in order to improve the signal-to-noise ratio of forward links for the different access terminals 116 and 122. Also, an access network using beamforming to transmit to access terminals scattered randomly through its coverage normally causes less interference to access terminals in neighboring cells than an access network transmitting through a single antenna to all its access terminals.

The AN may be a fixed station or base station used for communicating with the terminals and may also be referred to as an access point, a Node B, a base station, an enhanced base station, an eNodeB, or some other terminology. The AT may also be called User Equipment (UE), a wireless communication device, terminal, access terminal or some other terminology.

Figure 2:
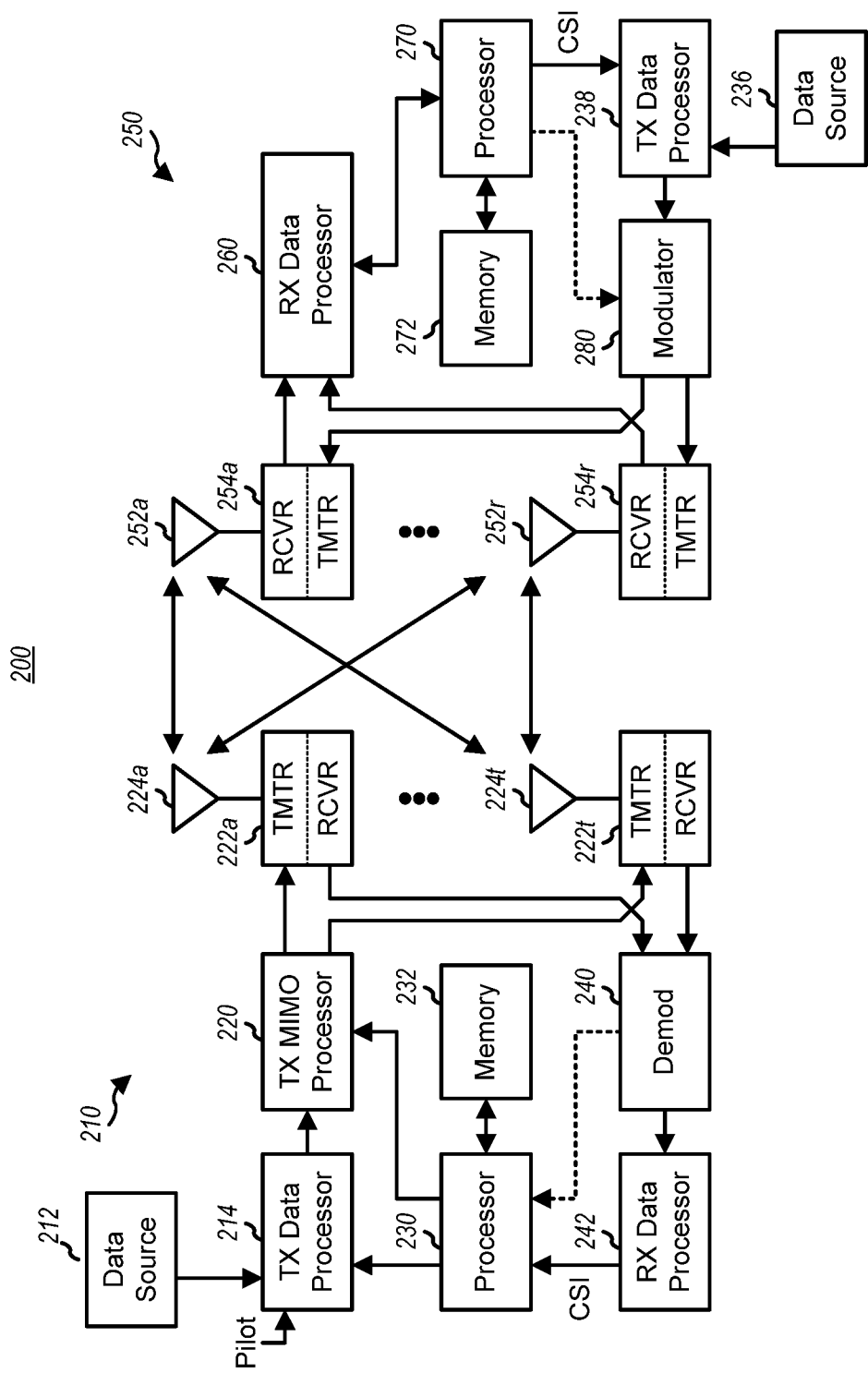
FIG. 2 is a block diagram of a transmitter system (also known as access network) and a receiver system (also known as user equipment or UE), in accordance with embodiments of the present invention.

FIG. 2 is a simplified block diagram of an embodiment of a transmitter system 210 (also known as the access network) and a receiver system 250 (also known as access terminal (AT) or user equipment (UE)) in a MIMO system 200. At the transmitter system 210, traffic data for a number of data streams is provided from a data source 212 to a transmit (TX) data processor 214.

In one embodiment, each data stream is transmitted over a respective transmit antenna. TX data processor 214 formats, codes, and interleaves the traffic data for each data stream based on a particular coding scheme selected for that data stream to provide coded data.

The coded data for each data stream may be multiplexed with pilot data using OFDM techniques. The pilot data is typically a known data pattern that is processed in a known manner and may be used at the receiver system to estimate the channel response. The multiplexed pilot and coded data for each data stream is then modulated (e.g., symbol mapped) based on a particular modulation scheme (e.g., BPSK, QPSK, M-PSK, or M-QAM) selected for that data stream to provide modulation symbols. The data rate, coding, and modulation for each data stream may be determined by instructions performed by processor 230.

The modulation symbols for all data streams are then provided to a TX MIMO processor 220, which may further process the modulation symbols (e.g., for OFDM). TX MIMO processor 220 then provides $N_T$ modulation symbol streams to $N_T$ transmitters (TMTR) 222a through 222t. In certain embodiments, TX MIMO processor 220 applies beamforming weights to the symbols of the data streams and to the antenna from which the symbol is being transmitted.

Each transmitter 222 receives and processes a respective symbol stream to provide one or more analog signals, and further conditions (e.g., amplifies, filters, and upconverts) the analog signals to provide a modulated signal suitable for transmission over the MIMO channel. $N_T$ modulated signals from transmitters 222a through 222t are then transmitted from $N_T$ antennas 224a through 224t, respectively.

At receiver system 250, the transmitted modulated signals are received by NR antennas 252a through 252r and the received signal from each antenna 252 is provided to a respective receiver (RCVR) 254a through 254r. Each receiver 254 conditions (e.g., filters, amplifies, and downconverts) a respective received signal, digitizes the conditioned signal to provide samples, and further processes the samples to provide a corresponding "received" symbol stream.

An RX data processor 260 then receives and processes the NR received symbol streams from NR receivers 254 based on a particular receiver processing technique to provide $N_T$ "detected" symbol streams. The RX data processor 260 then demodulates, deinterleaves, and decodes each detected symbol stream to recover the traffic data for the data stream. The processing by RX data processor 260 is complementary to that performed by TX MIMO processor 220 and TX data processor 214 at transmitter system 210.

A processor 270 periodically determines which pre-coding matrix to use (discussed below). Processor 270 formulates a reverse link message comprising a matrix index portion and a rank value portion.

The reverse link message may comprise various types of information regarding the communication link and/or the received data stream. The reverse link message is then processed by a TX data processor 238, which also receives traffic data for a number of data streams from a data source 236, modulated by a modulator 280, conditioned by transmitters 254a through 254r, and transmitted back to transmitter system 210.

At transmitter system 210, the modulated signals from receiver system 250 are received by antennas 224, conditioned by receivers 222, demodulated by a demodulator 240, and processed by a RX data processor 242 to extract the reserve link message transmitted by the receiver system 250. Processor 230 then determines which pre-coding matrix to use for determining the beamforming weights then processes the extracted message.

Memory 232 may be used to temporarily store some buffered/computational data from 240 or 242 through Processor 230, store some buffed data from 212, or store some specific program codes. And Memory 272 may be used to temporarily store some buffered/computational data from 260 through Processor 270, store some buffed data from 236, or store some specific program codes.

Figure 3:
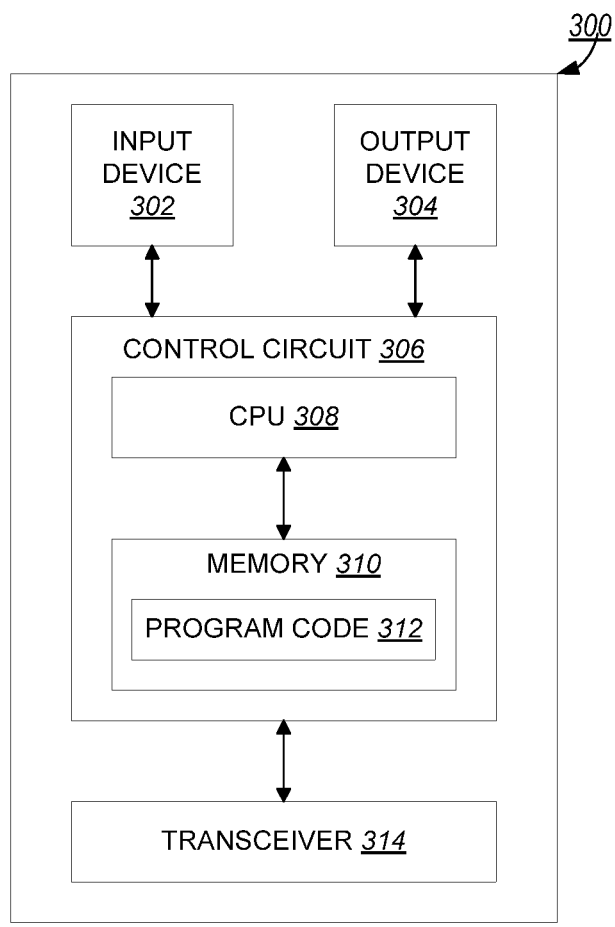
FIG. 3 is a functional block diagram of a communication system, in accordance with embodiments of the present invention.

Turning to FIG. 3, this figure shows an alternative simplified functional block diagram of a communication device according to one embodiment of the invention. As shown in FIG. 3, the communication device 300 in a wireless communication system can be utilized for realizing the UEs (or ATs) 116 and 122 in FIG. 1, and the wireless communications system is preferably the NR system. The communication device 300 may include an input device 302, an output device 304, a control circuit 306, a central processing unit (CPU) 308, a memory 310, a program code 312, and a transceiver 314. The control circuit 306 executes the program code 312 in the memory 310 through the CPU 308, thereby controlling an operation of the communications device 300. The communications device 300 can receive signals input by a user through the input device 302, such as a keyboard or keypad, and can output images and sounds through the output device 304, such as a monitor or speakers. The transceiver 314 is used to receive and transmit wireless signals, delivering received signals to the control circuit 306, and outputting signals generated by the control circuit 306 wirelessly.

Figure 4:
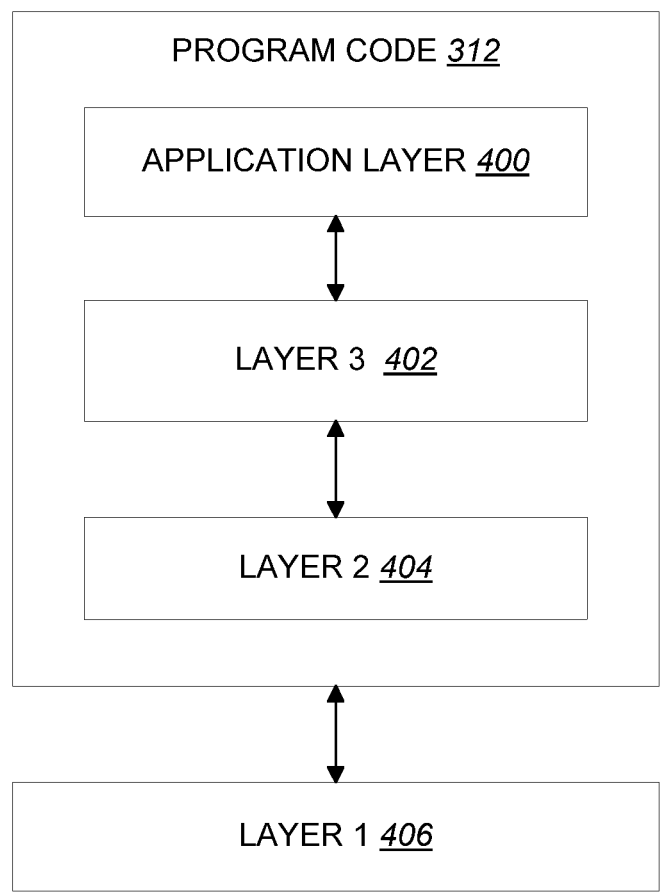
FIG. 4 is a functional block diagram of the program code of FIG. 3, in accordance with embodiments of the present invention.
Figure 5:
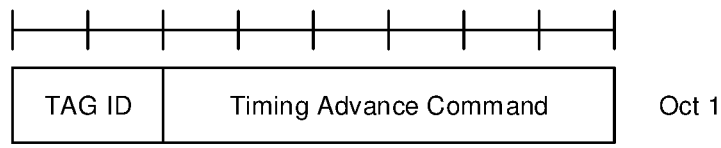
FIG. 5 is a reproduction of FIG. 6.1.3.4-1 of 3GPP TS 38.321, V16.5.0: Timing Advance Command MAC CE.
Figure 6:
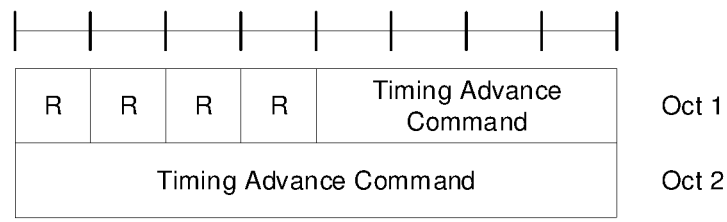
FIG. 6 is a reproduction of FIG. 6.1.3.4a-1 of 3GPP TS 38.321, V16.5.0: Absolute Timing Advance Command MAC CE.
Figure 7:
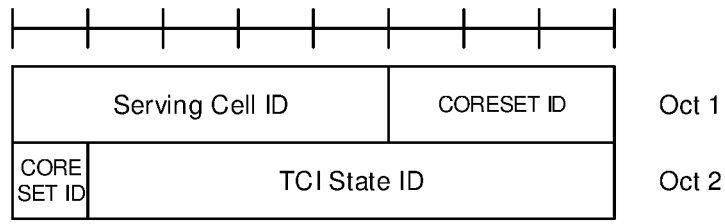
FIG. 7 is a reproduction of FIG. 6.1.3.15-1 of 3GPP TS 38.321, V16.5.0: TCI State Indication for UE-specific PDCCH MAC CE.
Figure 10:
FIG. 10 is a reproduction of FIG. 6.1.3.25-1 of 3GPP TS 38.321, V16.5.0: Enhanced PUCCH spatial relation Activation/Deactivation MAC CE.
Figure 11:
FIG. 11 is a reproduction of FIG. 6.1.3.26-1 of 3GPP TS 38.321, V16.5.0: Enhanced SP/AP SRS spatial relation Indication MAC CE.

FIG. 4 is a simplified block diagram of the program code 312 shown in FIG. 3 in accordance with an embodiment of the invention. In this embodiment, the program code 312 includes an application layer 400, a Layer 3 portion 402, and a Layer 2 portion 404, and is coupled to a Layer 1 portion 406. The Layer 3 portion 402 generally performs radio resource control. The Layer 2 portion 404 generally performs link control. The Layer 1 portion 406 generally performs physical connections.

For LTE, LTE-A, or NR systems, the Layer 2 portion 404 may include a Radio Link Control (RLC) layer and a Medium Access Control (MAC) layer. The Layer 3 portion 402 may include a Radio Resource Control (RRC) layer.

Any two or more than two of the following paragraphs, (sub-)bullets, points, actions, or claims described in each invention paragraph or section may be combined logically, reasonably, and properly to form a specific method.

Any sentence, paragraph, (sub-)bullet, point, action, or claim described in each of the following invention paragraphs or sections may be implemented independently and separately to form a specific method or apparatus. Dependency, e.g., "based on", "more specifically", "example", etc., in the following invention disclosure is just one possible embodiment which would not restrict the specific method or apparatus.

In Work item description for Further enhancements on MIMO for NR ([1] RP-193133 New WID: Further enhancements on MIMO for NR), beam management considering multi-TRP/panel operation, is considered as one of the objectives.

In 3GPP specification 38.213[2], timing adjustment for UL transmission is introduced.

In 3GPP specification 38.321[3], random access procedure and TA maintenance are introduced.

In 3GPP specification 38.331[4], Cell configuration and SRS configuration are introduced.

In 3GPP specification 38.211[5], frame structure is introduced.

In 3GPP specification 38.212[6], DCI format 1_0 is cited.

In New Radio (NR) enhancements to multiple-input/multiple-out (eMIMO) work item, multi-Transmission/Reception Point (TRP) (or mTRP) operation is introduced. A User Equipment (UE) could perform communication with a cell of a network (e.g., gNB) via more than one TRP of the cell. In Rel-16, multi-Physical Downlink Shared Channel (PDSCH) transmission is introduced. The UE could be indicated with two (activated) Transmission Configuration Indicator (TCI) states for receiving (two) PDSCH transmission occasions. Each TCI state could be associated with a PDSCH transmission. The PDSCH transmissions could have non-overlapping frequency and/or time domain resource allocation with respect to the other PDSCH transmission occasion. In NR release 17 work item on mimo enhancements ([1] RP-193133 New WID: Further enhancements on MIMO for NR), multi-TRP transmission for Physical Uplink Shared Channel (PUCCH), Physical Uplink Shared Channel (PUSCH) and Physical Downlink Control Channel (PDCCH) is introduced. The goal of multi-TRP PUSCH is for the UE to transmit a same data via multiple PUSCH to a network to achieve reliability (e.g., using spatial diversity of multiple TCI states or beams or spatial relation info). In Rel-17, inter-cell multi-TRP (or mTRP) operation is introduced. That is, a UE could be performing communication via a first TRP from a serving cell and a second TRP from a non-serving cell (e.g., a cell with a physical cell identity, Physical Cell Identity (PCI), different from a serving cell). In Rel-18 RAN workshop, (simultaneous) Uplink (UL) transmission via multi-panel is introduced. For an example, a UE could perform UL transmission on a serving cell using a first panel of the UE, and perform UL transmission on a non-serving cell using a second panel of the UE. In releases before Rel-17, mechanisms are designed that the TRPs in multi-TRP operation (in the same cell or across different cells) are synchronous. The UE could have the same UL time alignment (TA) among the TRPs when performing mTRP operation. In other words, the UE could perform UL transmission to TRPs in a mTRP operation by applying a single TA. In Rel-18, a more realistic scenario is discussed. Different TRPs could be in different location (e.g., may not be co-located) and may not be synchronous in a UE's perspective (that is, the TRPs could be asynchronous). In this invention, the mechanisms on how to obtain and/or maintain TA for asynchronous TRPs (associated with a same cell or different cells) in a multi-TRP operation.

Inter-Cell mTRP UE-Random Access Channel (RACH) Obtains TA

One concept of the invention is that a UE performing multi-TRP (mTRP) operation on a first TRP and a second TRP, the UE could obtain a first TA information associated with the first TRP and a second TA information associated with the second TRP. For a UE configured with UL resource(s) on a non-Serving Cell, the UE could initiate a random access procedure on (a TRP of) the non-Serving Cell. The UE could initiate the random access procedure to obtain TA information associated with (the TRP of) the non-Serving Cell. The UE could perform multi-TRP (mTRP) operation associated with the TRP on the non-Serving Cell (and another TRP on a Serving Cell). The UE may not consider the non-Serving Cell to be Serving cell (e.g., does not consider as a Secondary Cell or a Primary Cell) after completion of the random access procedure.

For example, the UE could perform mTRP operation on a first TRP on the non-Serving Cell and a second TRP on a Serving Cell. The UE could obtain a TA information associated with (the second TRP of) the Serving Cell via a previous random access procedure. The UE may not obtain the TA information associated with the non-Serving Cell via the previous random access procedure. The first TRP and the second TRP are not synchronous (e.g., the UE has different $N_{TA}$ and/or $N_{TA, \text{offset}}$ for the first TRP and the second TRP).

The UE could initiate a (latter) random access procedure on the first TRP (associated with the non-Serving Cell) in response to a signaling from the network. The signaling could be a PDCCH signaling (e.g., PDCCH order-like signal). The signaling could indicate the non-Serving Cell (e.g., indicates physical cell identity of the non-Serving Cell). The signaling could indicate the first TRP (e.g., indicates TCI state(s) and/or coresetpool index and/or Sounding Reference Signal (SRS) resource set(s) or spatial relation info or Beam Failure Detection Reference Signal (BFD-RS) set associated with the first TRP). Additionally and/or alternatively, the coresetpool index could be implicitly indicated by on which resource (e.g., Control Resource Set (CORESET)) the UE receives the PDCCH order (or the PDCCH signaling).

The (latter) random access procedure could be a contention-free and/or a contention-based random access procedure. The UE could obtain TA information associated with (the first TRP of) the non-Serving Cell from the (latter) random access procedure.

The UE could apply the TA information associated with (the first TRP of) the non-Serving Cell for UL transmissions on the first TRP of the non-Serving Cell. The UE could apply the TA information associated with (the second TRP of) the Serving Cell for UL transmissions on the second TRP of the Serving Cell.

Additionally and/or alternatively, the UE could determine whether to initiate a random access procedure on the (TRPs of) non-Serving Cell based on at least TA information is provided/configured when the non-Serving Cell is configured and/or activated. The UE may not initiate a random access procedure on the (TRPs of) non-Serving Cell if TA information of the (TRPs of) non-Serving Cell is provided or configured.

Additionally and/or alternatively, the UE could determine whether to initiate a random access procedure on the (TRPs of) non-Serving Cell based on at least whether resources and/or configurations for random access procedure on the non-Serving Cell is provided (by the network). The UE may not initiate a random access procedure on the (TRPs of) non-Serving Cell if no resources and/or configurations for random access procedure on the non-Serving Cell is provided.

The UE could initiate the random access procedure on the non-Serving Cell in response to an activation of a TCI state or spatial relation info associated with the non-Serving Cell. Additionally and/or alternatively, the UE could initiate the random access procedure on the non-Serving Cell in response to an activation of a TRP associated with the non-Serving Cell. Additionally and/or alternatively, the UE could initiate the random access procedure on the non-Serving Cell in response to PDCCH order (or the PDCCH signaling) provided by a network.

Additionally and/or alternatively, the UE could determine whether to initiate the random access procedure on the non-Serving Cell in response to activation of TRPs or TCI state(s) or spatial relation info associated with the non-Serving Cell based on at least whether a TA information (associated with the non-Serving Cell or TRP) is provided when the non-Serving Cell is configured or when the UL resource(s) of the non-Serving Cell is configured. The UE may not initiate the random access procedure on the non-Serving Cell if a TA information associated with the non-Serving Cell was provided when the non-Serving Cell is configured or TA information associated with the TRP.

Additionally and/or alternatively, the UE could determine whether to initiate the random access procedure on the non-Serving Cell in response to an activation signaling of TRPs or TCI state(s) or spatial relation info associated with the non-Serving Cell based on (the content or attribute of) the activation signaling. The UE could determine to initiate the random access procedure on the non-Serving Cell in response to the activation signaling if or when the activation signaling indicates the UE to perform a random access procedure (to obtain TA information of the non-Serving Cell). The UE could determine to not initiate the random access procedure on the non-Serving Cell in response to the activation signaling if or when the activation signaling does not indicate the UE to perform a random access procedure. The UE could apply TA information of the Serving Cell for UL transmissions on the non-Serving Cell (after activation of the non-Serving Cell). The activation signaling could be a PDCCH signaling. The activation signaling could indicate the UE to apply (existing) TA information of a Serving Cell on the non-Serving Cell.

Additionally and/or alternatively, the UE could determine whether to initiate the random access procedure on the non-Serving Cell in response to activation of TRPs or TCI state(s) or spatial relation info associated with the non-Serving Cell based on at least whether there is a valid TA information for the non-Serving Cell or TRP. The UE may not initiate a random access procedure on the non-Serving Cell if there is a valid TA information for the non-Serving Cell when the TRP of the non-Serving Cell is activated. The UE could apply the valid TA information of the non-Serving Cell for UL transmissions on the non-Serving Cell (after activation of the non-Serving Cell). For example, a UE could consider a TA information to be valid when a timer (e.g., timealignmenttimer) associated with the TA information is running.

Additionally and/or alternatively, the UE could stop the timer when the TRP of the non-Serving Cell is deactivated.

The UE could consider a TA information to be invalid when a timer (e.g., timealignmenttimer) associated with the TA information is not running.

Intra-Cell mTRP UE-RACH Obtains TA

Another concept of the invention is that for a UE performing a mTRP operation on a first TRP on a Cell and a second TRP on the (same) Cell, the UE could initiate a first random access procedure for the first TRP on the Cell to obtain first TA information of the first TRP, and initiate a second random access procedure for the second TRP on the Cell to obtain second TA information of the second TRP.

For example, for a UE configured with UL resource(s) of a serving cell, the UE is configured with a first TRP of the serving Cell for UL transmission. The UE initiates a first random access procedure on the first TRP of the Serving Cell to obtain first TA information of the first TRP (e.g., initiates by a PDCCH order by a network or initiates in response to connection establishment). The UE performs UL and/or Downlink (DL) communication with the first TRP by applying the first TA information of the first TRP. The UE is configured with a second TRP of the Serving Cell. The network could indicates the UE to perform (intra-cell) mTRP operation (e.g., DL or UL transmission) on the first TRP and the second TRP. The network could indicate the UE to perform mTRP operation via an activation signaling, e.g., a TCI states activation Medium Access Control (MAC) Control Element (CE) (or a spatial relation info activation MAC CE) indicating activation of (UL or DL) TCI state(s) (or the spatial relation info) associated with the second TRP. The first TRP and the second TRP are not synchronous. The UE initiates a second random access procedure on the second TRP, in response to the TCI states activation MAC CE (or a spatial relation info activation MAC CE), to obtain second TA information of the second TRP. In response to completion of the second random access procedure, the UE could perform UL and/or DL communication with the second TRP by applying the second TA information of the second TRP (and perform UL and/or DL communication with the first TRP by applying the first TA information). Additionally and/or alternatively, the UE may not initiate the second random access procedure in response to a PDCCH order. The UE initiates the second random access procedure in response to activation of the second TRP or activation of multi-TRP operation. Additionally and/or alternatively, the UE initiates the second random access procedure in response to receiving a PDCCH signaling, wherein the PDCCH signaling indicates the UE to perform UL transmission on a second TRP or activate mTRP operation.

The UE could determine whether to obtain and/or maintain a second TA information (for a second TRP) for a Cell (in addition to a first TA information) via a random access procedure in response to receiving a PDCCH signaling based on at least a format or field of the PDCCH signaling. The UE may not obtain a second TA information if the PDCCH signaling is a PDCCH order (e.g., Downlink Control Information (DCI) format 1_0). The UE could initiate a random access procedure and obtain a second TA information if the PDCCH signaling is not a PDCCH order (e.g., PDCCH signaling indicates, in a field, a random access procedure for the second TRP). Preferably, the field may be one bit for identifying update current TA or obtain a second TA. Preferably, the field may be reusing one bit in current reserved bit of DCI format 1_0. Additionally and/or alternatively, the UE could determine whether to obtain a second TA information in response to the PDCCH signaling based on at least a resource (e.g., CORESET) on which the UE receives the PDCCH signaling. The UE could initiate the random access procedure on the second TRP in response to the PDCCH signaling (and obtain a second TA information for the second TRP) if or when the PDCCH signaling is received on a CORESET associated with the second TRP. The UE may not initiate the random access procedure on the second TRP in response to the PDCCH signaling if or when the PDCCH signaling is received on a CORESET associated with the first TRP. The UE could update or renew the first TA information of the first TRP if or when the PDCCH signaling is received on a CORESET associated with the first TRP.

Additionally and/or alternatively, the UE could determine whether to initiate the random access procedure on the second TRP in response to an activation signaling (e.g., TCI state or spatial relation info activation MAC CE) associated with the second TRP based on (the content or attribute of) the activation signaling. The UE could determine to initiate the random access procedure on the second TRP in response to the activation signaling if or when the activation signaling indicates the UE to perform a random access procedure (to obtain TA information of the second TRP). The UE could determine to not initiate the random access procedure on the second TRP in response to the activation signaling if or when the activation signaling does not indicate the UE to perform a random access procedure. The UE could apply (the first) TA information of the first TRP for UL transmissions on the second TRP (after activation of the second TRP).

Additionally and/or alternatively, the UE could determine whether to initiate the random access procedure on the second TRP in response to activation of TCI state(s) (or spatial relation info) associated with the second TRP based on at least whether there is a valid TA information for the second TRP. The UE may not initiate a random access procedure on the second TRP if there is a valid TA information for the second TRP when the second TRP is activated. The UE could apply the valid TA information of the second TRP for UL transmissions on the second TRP (after activation of the second TRP). For example, a UE could consider a TA information to be valid when a timer (e.g., timealignmenttimer) associated with the TA information is running. The network could indicate (via Radio Resource Control (RRC) message or activation signaling of the TRP) the UE a valid TA information of the second TRP. The valid TA information could be associated with or the same as the TA information of the first TRP.

Additionally and/or alternatively, the UE could stop the timer when the second TRP of the Serving Cell is deactivated. The UE could consider a TA information to be invalid when a timer (e.g., timealignmenttimer) associated with the TA information is not running.

The first TRP and the second TRP are not synchronous. The UE could maintain different set of $N_{TA}$ and/or $N_{TA, offset}$ for the first TRP and the second TRP.

Additionally and/or alternatively, the UE could determine whether to initiate a random access procedure on the second TRP on the Cell based on at least TA information is provided/configured when the second TRP is configured and/or activated. The UE may not initiate a random access procedure on the second TRP if TA information of the second TRP is provided or configured.

Additionally and/or alternatively, the UE could determine whether to initiate the random access procedure on the second TRP in response to activation of the second TRP of the Cell based on at least whether resources and/or configurations for Random access procedure on the second TRP is provided (by the network). The UE may not initiate a random access procedure on the second TRP if no resources and/or configurations for Random access procedure on the second TRP is provided. The resources and/or configuration for random access procedure could be configured/provided in a per-TRP basis (e.g., more than one set of resources in one Cell used for different TRPs/TCI states/spatial relation info).

Additionally and/or alternatively, the network could provide SRS configuration of a SRS resource (set) (e.g., SRS-config) associated with a second TRP of a Cell for the UE. The SRS resource (set) could indicate periodic and/or slot offset of SRS resource(s). The UE could transmit SRS to the second TRP based on the SRS configuration. The UE could (start to) transmit SRS via the SRS resource(s) in response to receiving the SRS configuration (e.g., periodic SRS transmission). Alternatively, the UE could (start to) transmit SRS via the SRS resource(s) in response to receiving an activation signaling of the SRS configuration (e.g., semi-persistent SRS transmission).

The UE could apply the TA information (e.g., Timing Advance $N_{TA}$ and/or offset $N_{TA,offset}$) of the first TRP of the Cell to SRS transmitted via the SRS resource(s) of the second TRP. Alternatively, the UE could apply no (or zero) TA to SRS transmitted via the SRS resource(s) of the second TRP. Alternatively, the UE could apply a previously configured TA information of the second TRP (e.g., via RRC reconfiguration message) to SRS transmitted via the SRS resource(s). The SRS could be transmitted before initiation or completion of the random access procedure.

The UE could transmit the SRS (via SRS resource(s) of the second TRP) via UL beam(s) associated with the second TRP.

In response to activation of the second TRP or indicated by the network, the UE could initiate a random access procedure to the network and obtain a second TA information of the second TRP. The UE could apply or use the second TA information of the second TRP for transmitting the SRS via the SRS resource(s) of the second TRP after or in response to completion of the random access procedure or activation of the second TRP. The UE could apply or use the TA information of the first TRP for transmitting SRS via SRS resource(s) of the first TRP (before and after the random access procedure on the second TRP). The UE could transmit the SRS (via SRS resource(s) of the first TRP) via UL beam(s) associated with the first TRP.

NW-Provided TA

Another concept of the invention is that for a UE performing multi-TRP (mTRP) operation on a first TRP and a second TRP, a network could provide or configure a first TA information associated with the first TRP and a second time alignment information associated with the second TRP. The network could provide a per-TRP TA information to the UE.

The first TRP could be associated with a first Cell (e.g., a Serving Cell of the UE), and the second TRP could be associated with a second Cell (e.g., a non-serving Cell of the UE). The first TRP could be a TRP of the first Cell. The second TRP could be a TRP of the second Cell.

Alternatively, the first TRP and the second TRP could be associated with a same cell (e.g., a serving Cell of the UE or a non-serving Cell of the UE). For the UE, the Cell could be associated with two or more different TA information, which are associated with different TRPs of the Cell.

In one example, for a UE performing UL transmission or configured with UL resources on a TRP of a non-Serving Cell, the network could provide or (pre-)configure a first TA information associated with the non-Serving Cell. Additionally and/or alternatively, the first TA information could be associated with a TRP of the non-Serving Cell (and not associated with other TRPs of the non-Serving Cell). The network could provide the first TA information via a RRC configuration (e.g., RRCReconfiguration message). The network could configure the first TA information of the non-Serving Cell when or in addition to configuring the non-Serving Cell to the UE. The UE may not apply the first TA information in response to receiving the configuration. The UE may not apply the first TA information until the TRP is activated for the UE (to perform UL transmission) and/or the non-Serving Cell is used for mTRP operation.

The first TA information could be associated with a TA of a Serving Cell (or a Timing Advance Group (TAG). For example, the first TA information could indicate that a TA of (the TRP of) the non-serving cell has the same value of the TA of the Serving Cell. Alternatively, the first TA information could indicate an offset for a TA of (the TRP of) the non-serving cell in respect to the value of the TA of the Serving Cell. The offset could be non-zero (or zero). The first TA information could indicate an identity of the Serving Cell.

Alternatively, the first TA information could indicate that a TA of (the TRP of) the non-serving cell is zero.

In another example, for a UE performing UL transmission or configured with UL resources on a TRP of a Serving Cell, the network could provide or (pre-)configure a first TA information associated with a first TRP of the Serving Cell and a second TA information associated with a second TRP of the Serving Cell.

The second TA information could be associated with a first TA information of the Serving Cell (or a TAG). For example, the first TA information could indicate that the TA of a first TRP of Serving Cell has the same value of the TA of the second TRP. Alternatively, the second TA information could indicate an offset for the second TA of the second TRP in respect to the value of the TA of the first TRP. The offset could be non-zero (or zero). The first TA information could indicate the second TRP (for referencing the TA value).

Alternatively, the first TA information could indicate that a TA of (the TRP of) the Serving Cell is zero.

Additionally and/or alternatively, for a UE configured with a mTRP operation on one or more Cell (e.g., mTRP operation on a single Serving Cell and/or mTRP operation on a Serving Cell and a non-Serving Cell). The network could provide or configure TA information associated with a TRP of the one or more Cell in response to or upon activation of the TRP.

For example, the network could transmit, to the UE, a signaling (e.g., an activation signaling) activating a TRP at least for UL transmission. The signaling could contain a TCI state activation (e.g., MAC CE). The signaling could contain spatial relation info indication or activation (e.g., MAC CE). The network could indicate a TA information associated with the TCI state in the signaling. Additionally and/or alternatively, the network could indicate the TA information associated with the TCI state or with the spatial relation info via a second signaling different from the signaling.

For example, the network could indicate the TA information via a DCI (or via PDCCH). Alternatively, the network could indicate the TA information associated with the TRP via a MAC CE (e.g., Timing Advance Command MAC CE or Absolute Timing Advance Command MAC CE).

NW Determine TA for Second TRP Based on Received SRS and First TRP's TA

In one example, the network could determine a TA information of a second TRP for the UE based on SRS transmitted to the second TRP by the UE. Additionally and/or alternatively, the network could determine the TA information of the second TRP for the UE based on SRS transmitted to the second TRP by the UE and based on a first TA information associated with a first TRP. The network could obtain/determine the first TA information via random access procedure initiated from the UE to the first TRP. The network may not obtain/determine the TA information of the second TRP for the UE via random access procedure.

For example, the network could provide SRS configuration of a SRS resource (set) (e.g., SRS-config) associated with a second TRP of a Cell for the UE. The SRS resource (set) could indicate periodic and/or slot offset of SRS resource(s). The UE could transmit SRS to the second TRP based on the SRS configuration. The UE could (start to) transmit SRS via the SRS resource(s) in response to receiving the SRS configuration (e.g., periodic SRS transmission). Alternatively, the UE could (start to) transmit SRS via the SRS resource(s) in response to receiving an activation signaling of the SRS configuration (semi-persistent SRS transmission).

The UE could apply the TA information (e.g., Timing Advance $N_{TA}$ and/or offset $N_{TA,offset}$) of the first TRP to SRS transmitted via the SRS resource(s) of the second TRP. Alternatively, the UE could apply no (or zero) TA to SRS transmitted via the SRS resource(s) of the second TRP. Alternatively, the UE could apply a previously configured TA information of the second TRP (e.g., via RRC reconfiguration message) to SRS transmitted via the SRS resource(s).

The UE could transmit the SRS via UL beam(s) associated with the second TRP.

The network, in response to receiving the SRS, could derive or determine the (relative) timing difference between the first and the second TRP for the UE based on timing of the received SRS. The network could derive (absolute) Timing Advance associated with the second TRP for the UE based on at least the SRS transmission. The network could determine TA information (e.g., Timing Advance $N_{TA}$ and/or offset $N_{TA,offset}$ and/or Timing Advance command TA) of the second TRP based on the SRS received. The network could provide/configure the TA information of the second TRP to the UE after receiving the SRS. For example, the network could provide a Timing Advance command to the UE for adjusting UL transmission timing for the second TRP. The UE could apply or use the TA information of the second TRP for transmitting the SRS via the SRS resource(s) of the second TRP after or in response to receiving the TA information of the second TRP (e.g., before activating the second TRP). The UE could apply or use the TA information of the first TRP for transmitting SRS via SRS resource(s) of the first TRP (before and after receiving the TA information of the second TRP).

Alternatively, the UE could apply or use the TA information of the second TRP for transmitting the SRS (and/or transmitting via PUSCH/PUCCH) after activating the second TRP or after activating any of TCI state(s) associated with the second TRP. The UE could apply or use the TA information of the first TRP for transmitting SRS via SRS resource(s) of the first TRP (before and after activating the second TRP and/or TCI state(s) associated with the second TRP). The UE could transmit the SRS (via SRS resource(s) of the first TRP) via UL beam(s) associated with the first TRP.

The second TRP could be associated with a non-Serving Cell (e.g., the UE could perform inter-cell mTRP operation on the first TRP, associated with a serving cell, and the second TRP associated with the non-serving cell). The SRS configuration could be associated with the non-Serving Cell. The UE could start transmitting SRS to the non-Serving Cell in response to receiving the SRS configuration of the non-Serving Cell.

Alternatively, the second TRP could be associated with a Serving Cell. The second TRP could be associated with a same cell as the first TRP.

NW Pre-Configures Second TRP TA, and UE Transmits SRS after Receiving the TA

Alternatively, the network may not provide or derive the TA information of the second TRP based on SRS transmission from the UE to the second TRP. For example, the network could provide or pre-configure the TA information of the second TRP to the UE (e.g., via RRC reconfiguration or via cell configuration). The UE may not apply the TA information of the second TRP upon receiving the configuration. The UE could apply the TA information in response to activation of the second TRP (e.g., activation of UL/DL panel or TCI states or spatial relation info associated with the TRP). The UE could apply the TA information in response to completion of a random access procedure associated with the second TRP or associated with the first TRP.

The TA information of the second TRP could contain a relative value associated with the first TA information of the first TRP. For example, the TA information of the second TRP could contain an (slot) offset relative to the first TA information of the first TRP. The offset set to 0 could indicate that the UE applies the same TA information (e.g., $N_{TA}$ and/or $N_{TA,offset}$) as the first TRP on the second TRP. Additionally and/or alternatively, the TA information of the second TRP could indicate (e.g., via a cell index or bit value) whether the second TRP is synchronous with the first TRP or not. The UE could apply the first TA information of the first TRP (e.g., apply $N_{TA}$ and/or $N_{TA,offset}$) on the second TRP if the TA information of second TRP indicates the second TRP is synchronous with the first TRP.

Additionally and/or alternatively, the TA information of the second TRP could contain an (absolute) value for timing advance or timing adjustment for UE performing UL transmission (e.g., PUCCH, PUSCH, SRS) to the second TRP. The TA information set to 0 could indicate that the UE sets $N_{TA}$ and/or $N_{TA,offset}$ to 0 for the second TRP. Additionally and/or alternatively, the TA information of the second TRP could indicate or contains a cell or TRP information (e.g., TCI state/coresetPool index/SRS resource set/serving cell index/spatial relation info). The UE could set the TA information of the second TRP by applying the same TA information of the cell or the TRP indicated.

Obtain TA Via RACH

Additionally and/or alternatively, the network may not provide/configure TA information of the second TRP, e.g., via RRC configuration or via activation signaling of the second TRP. The UE could determine whether to initiate a random access procedure to obtain TA information of a second TRP of a Cell based on at least whether TRP configuration and/or Cell configuration indicates or contains TA information of the second TRP.

The UE could initiate a random access procedure on the second TRP (in order to obtain a TA information) when or if no TA information of the second TRP is provided/configured by the network. Additionally and/or alternatively, the UE could initiate a random access procedure on the second TRP (in order to obtain a TA information) when or if random access resource (e.g., RACH resources) is provided or configured for the second TRP. The UE could initiate the random access procedure when the second TRP is configured/activated. The UE may not initiate a random access procedure to obtain TA information of the second TRP if TA information of the second TRP is provided/configured by the network, e.g., via the TRP configuration and/or Cell configuration.

TRP-Level Based TAG

Additionally and/or alternatively, for a UE performing mTRP operation on a first TRP and a second TRP, the UE could be configured with or provided with a first TAG id associated with the first TRP and a second TAG id associated with the second TRP. The first TRP could be associated with a first TAG and the second TRP could be associated with a second TAG. The UE could be configured with or maintain a first time alignment timer (TAT) for the first TAG, and a second TAT for the second TAG. The first TRP could be associated with a first set of one or more TCI state(s) or beam(s) configured for the UE, and the second TRP could be associated with second set of one or more TCI state(s) or beam(s) configured for the UE. For an example, the UE could be configured with a first (set of) TCI state(s) and a second (set of) TCI state(s) via RRC configuration. The first (set of) TCI state(s) could be associated with a serving cell indicated by a servingcellindex, and the second (set of) TCI state(s) could be associated with a non-serving cell indicated by a PCI or the same serving cell. The first (set of) TCI state(s) could be associated with, or configured with a first TAG id and the second (set of) TCI state(s) could be associated with, or configured with a second TAG id.

Additionally and/or alternatively, the first TRP could be associated with a first set of one or more spatial relation (info) and the second TRP could be associated with a second set of one or more spatial relation (info). For an example, the UE could be configured with a first (set of) spatial relation and a second (set of) spatial relation via RRC configuration. The first (set of) spatial relation could be associated with a serving cell indicated by a servingcellindex, and the second (set of) spatial relation could be associated with a non-serving cell indicated by a PCI or the same serving cell. The first (set of) spatial relation could be associated or configured with a first TAG id and the second (set of) spatial relation could be associated with, or configured with a second TAG id. For each TRP or for each TAG associate with different TRPs, the UE could maintain a Timing Advance between DL and UL ($N_{TA}$). A network could provide a different Timing Advance command for each TRP (via a Timing Advance command MAC CE).

Cell-Level Based TAG

A non-Serving Cell could be configured with a TAG (different from serving cell's TAG), or a TAG dedicated for non-Serving Cell(s).

Additionally and/or alternatively, the UE could be configured, by a network (e.g., gNB), with a TAG associated with a non-serving cell. The UE performs inter-cell mTRP operation via DL and/or UL resources of the non-Serving Cell and via DL and/or UL resources of a serving cell. The TAG associated with the non-serving cell could be different from a second TAG associated with the serving cell.

For example, for a UE performing inter-cell mTRP operation on a serving cell and a non-serving cell. The UE could be configured with a first TAG associated with the serving cell (serving cell is in the group of cells associated with the first TAG) and a second TAG associated with the non-serving cell (non-serving cell in a second group of cells associated with the second TAG). The UE could maintain different time alignment timers (e.g., a first TAT) for the first TAG (associated with the serving cell) and the second TAG (associated with the non-serving cell). The UE could maintain different timing advances (e.g., first $N_{TA}$ and second $N_{TA}$) for the first TAG (associated with the serving cell) and the second TAG (associated with the non-serving cell).

In another example, the UE could be configured with a non-serving cell TAG (dedicated) for one or more non-serving cells. The UE could perform (inter-cell) mTRP operation on the one or more non-serving cells (with one or more serving cells). The TAG may not be associated with a (activated) serving cell. When a time alignment timer associated with the non-serving cell TAG expires, the UE could flush all Hybrid Automatic Repeat Request (HARQ) buffer for all non-serving cells and/or the UE could release PUCCH and/or SRS for all non-serving cells and/or the UE could switch to single TRP operation on serving cells.

Each Non-Serving Cell is One Individual without a Group; or First TRP in an Intra-Cell Belongs to a TAG, but Second TRP does not Belong to a TAG Additionally and/or alternatively, the UE could be configured or provided with a TAG associated with the first TRP, and the second TRP may not be associated with or configured with a TAG. The UE could be provided with a time alignment timer for the second TRP. The UE could maintain a (individual) Timing Advance (or $N_{TA}$). Additionally and/or alternatively, the UE could be provided with an offset (slot or symbol offset or microseconds or one or more time units, e.g., $T_C$) associated with timing advance of the first TRP. The UE could derive TA of the second TRP based on the offset and the TA of the first TRP.

In another example, non-serving cells of the UE may not be associated with a TAG. Each of the non-serving cells could be configured with or maintain a (individual) time alignment timer. Each of the non-serving cells could maintain an (individual) $N_{TA}$ (or Timing Advance between downlink and uplink). Alternatively, the UE could be provided with an offset (slot or symbol offset or microseconds or one or more time units, e.g., $T_C$) associated with Timing Advance of a serving cell. The UE could derive TA of the non-serving cell based on the offset and the TA of the serving cell.

Two TRPs Belong to One TAG, Maintaining Two $N_{TA}$ or $N_{TA}$+Offset; or Serving Cell and Non-Serving Cell Associated with One TAG, Two $N_{TA}$ or $N_{TA}$+Offset Additionally and/or alternatively, the first TRP and the second TRP could be associated with a same TAG. The UE could maintain a same time alignment timer for both the first TRP and the second TRP. The UE could maintain a first Timing Advance (between DL and UL) for the first TRP and a second Timing Advance for the second TRP (in the TAG). Additionally and/or alternatively, the UE could maintain, or the network could provide a first TA for the first TRP and an offset for the second TRP in the TAG. The offset could be an offset based on the first TA. The UE could derive TA for the non-serving cell based on the first TA and the offset (e.g., TA for the second TRP equals the first TA plus the offset for the second TRP).

Additionally and/or alternatively, the serving cell and the non-serving cell could be associated with a same third TAG.

Additionally and/or alternatively, the serving cell could be associated with a same TAG as the TAG associated with the non-serving cell. The serving cell and the non-serving cell could be associated with a same TAG. The UE could maintain a same time alignment timer for both the serving cell and the non-serving cell. The UE could maintain a first Timing Advance (between DL and UL) for the serving cell and a second Timing Advance for the non-serving cell (in the TAG). Additionally and/or alternatively, the UE could maintain, or the network could provide a first TA for serving cell and an offset for the non-serving cell in the TAG. The offset could be an offset based on the first TA. The UE could derive TA for the non-serving cell based on the first TA and the offset (e.g., TA for the non-serving cell equals the first TA plus the offset for the non-serving cell).

The UE could maintain two TATs, the first TAT and the second TAT, for multi-TRP (mTRP) operation on a first TRP and a second TRP. The first TAT could be associated with the first TRP. The second TAT could be associated with the second TRP. The first TRP and the second TRP could be associated with the same serving cell. Alternatively, the second TRP could be associated with a non-serving cell which is associated with a serving cell of the first TRP.

When or in response to the first TAT expires, the UE could perform one or more of the following actions:
  Flush all HARQ buffers for the serving cell.
  Release PUCCH for the serving cell.
  Release SRS for the serving cell.
  Clear any configured downlink assignments and configured uplink grants of the serving cell.
  Clear any PUSCH resource for semi-persistent channel state information (CSI) reporting for the serving cell.
  Maintain $N_{TA}$ of the first TAG or the third TAG.

Additionally and/or alternatively, the UE could perform one or more of the following actions in response to expiry of the first TAT (while the second TAT is still running and is not expired):
  (not) Flush all HARQ buffers for the non-serving cell.
  (not) Release PUCCH for the non-serving cell.
  (not) Release SRS for the non-serving cell.
  (not) Clear any configured downlink assignments and configured uplink grants for the non-serving cell.
  (not) Clear any PUSCH resource for semi-persistent CSI reporting for the non-serving cell.
  (not) Maintain $N_{TA}$ of the second TAG or the third TAG.

Additionally and/or alternatively, the UE could consider the second TAT to be expired when or in response to the expiry of the first TAT.

When or in response to the second TAT expires, the UE could perform one or more of the following actions:
  Flush all HARQ buffers for the non-serving cell.
  Release PUCCH for the non-serving cell.
  Release SRS for the non-serving cell.
  Clear any configured downlink assignments and configured uplink grants for the non-serving cell.
  Clear any PUSCH resource for semi-persistent CSI reporting for the non-serving cell.
  Maintain $N_{TA}$ of the second TAG.

Additionally and/or alternatively, the UE could perform one or more of the following actions in response to expiry of the second TAT (while the first TAT is still running and is not expired):
  (not) Flush all HARQ buffers for the serving cell.
  (not) Release PUCCH for the serving cell.
  (not) Release SRS for the serving cell.
  (not) Clear any configured downlink assignments and configured uplink grants of the serving cell.
  (not) Clear any PUSCH resource for semi-persistent CSI reporting for the serving cell.
  (not) Maintain $N_{TA}$ of the first TAG.

Additionally and/or alternatively, the UE could consider the first TAT to be expired when or in response to the expiry of the second TAT.

For a UE performing inter-cell mTRP operation between a serving cell and a non-serving cell, when a time alignment timer associated with the non-serving cell expires (and a second time alignment timer associated with the serving cell is not expired), the UE could switch from mTRP operation to single TRP operation on the serving cell.

TAC MAC CE Format

A network could provide time alignment (TA) information for different TRPs (e.g., the first TRP and the second TRP above) of the UE. Each of the different TRPs could be associated with different Timing Advance between DL and UL.

For example, the network (e.g., a gNB) could provide or transmit a MAC CE to the UE for the UE to apply a Timing Advance command. The MAC CE could contain one or more of following field:
  One or multiple TAG id fields, each indicating id of a TAG.
  One or multiple Non-serving cell id fields, each indicating identity (e.g., PCI) of a non-serving cell.
  One or multiple Timing Advance Command (TAC) fields, each indicating a relative or absolute Timing Advance for a TRP.
  One or multiple Offset fields, each indicating a timing offset for the UE to derive TA for a TRP (based on TA of another TRP).

Figures 12, 13, 14A:
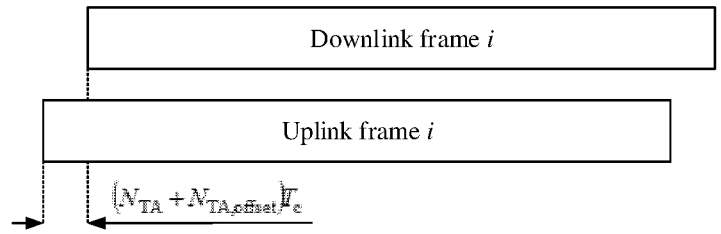

For example, the network (e.g., a gNB) could provide or transmit a MAC CE to the UE for the UE to apply a TAC for the TRPs associated with the serving cell and/or the non-serving cell (e.g., a (extended) TAC MAC CE). The extended TAC MAC CE could provide TA command for more than one TRPs associated with the UE. The UE could apply different TA command to corresponding TRPs in response to the reception of the MAC CE. An example of an extended TAC MAC CE is shown in FIG. 13. For a UE performing multi-TRP operation on different TRPs, TRP1 and TRP2 (e.g., via different TCI states or via different spatial relation associated with the TRPs), the network transmits an extended TAC MAC CE for providing TA command to the TRPs. The MAC CE contains or indicates two TAG ids, TAG ID_1 and TAG ID_2. Each of the indicated TAG id is followed by a TA command, which are TAC_TRP1 and TAC_TRP2, respectively. The TRP1 is associated with a TAG with TAG ID_1 and the TRP2 is associated with a TAG with TAG ID_2. Additionally and/or alternatively, the TRP_1 is associated with a cell (e.g., a serving cell or a non-serving cell), wherein the cell is associated with TAG ID_1, and the TRP_2 is associated with a cell (e.g., a same cell as the TRP1's associated cell or a different cell), wherein the cell is associated with TAG ID_2. The UE applies the TA command TAC_TRP1 to the TRP1 (and/or to the TAG with TAG ID_1) and applies the TA command TAC_TRP2 to the TRP 2 (and/or to the TAG with TAG ID_2) in response to receiving the MAC CE.

TAC Command for Non-Serving Cell

Another example of an extended TAC MAC CE (for non-serving cell) is shown in FIG. 14A. The MAC CE could optionally contain reserved bit (R). The MAC CE could contain a TAG ID. The TAG ID could be associated with at least one non-serving cell. The UE could perform UL transmission via the at least one non-serving cell (e.g., based on inter-cell mTRP operation with a serving cell). Additionally and/or alternatively, the MAC CE could contain an identity indicating or associated with a non-serving cell (e.g., a physical cell id, PCI). The MAC CE could contain a TA command for non-serving cell (TAC_non-serving cell). The TA command could be an absolute value of Timing Advance between DL and UL of the non-serving cell ($N_{TA}$). Alternatively, the TA command could be a relative value for adjusting current Timing Advance between DL and UL of the non-serving cell. Alternatively, the TA command could indicate a offset between Timing Advance of the at least one non-serving cell and Timing Advance of a serving cell, wherein the UE performs inter-cell operation between the at least one non-serving cell and the serving cell. The UE could apply the TA command to the at least one non-serving cell indicated by the TAG ID or by the non-serving cell ID. Another example is shown in FIG. 14B, where the MAC CE indicates an offset (Offset_TRP2) for a second TRP. The Offset_TRP2 is a timing offset relative to timing advance of a first TRP, TA1. The UE could perform multi-TRP operation between the first and the second TRP. The UE could derive Timing Advance of the second TRP, TA2, based on the Offset1 and the Timing Advance of the first TRP (e.g., TA2=TA1+Offset_TRP2). The MAC CE could contain second TRP information (e.g., PCI or serving cell index or a TAG ID associated with the second TRP).

One TAG for Both Serving Cell and Non-Serving Cell, and Two TAC/One TAC+ One Offset is Provided Another example of an extended TAC MAC CE is shown in FIG. 15A. The UE could perform multi-TRP operation with a first TRP and a second TRP. The MAC CE could contain one TAG ID (TAG ID_P). The TAG ID_P could be associated with at least a first TRP (or associated with at least the first TRP and the second TRP). The MAC CE could contain a first TA command for a first TRP (TAC_TRP1). The MAC CE could contain a second TA command for a second TRP (TAC_TRP2). The UE could apply the TAC_TRP1 to the first TRP (e.g., the UE determines which TRP is the first based on smallest TCI state id or spatial relation info id associated with the TRPs). The UE could apply the TAC_TRP2 to the second TRP (e.g., the UE determines which TRP associated to second TAC based on highest TCI state id or spatial relation info id associated with the TRPs). The first and/or the second TA command could be a relative value for adjusting a current Timing Advance for the first and/or the second TRP. Alternatively, the first and/or the second TA command could be an absolute value for the UE to apply or set a Timing Advance on the first and/or the second TRP. The first TRP and the second TRP could be associated with the same serving cell. Alternatively, the second TRP could be associated with at least one non-serving cell, wherein the UE performs inter-cell mTRP operation with the at least one serving cell and the at least one non-serving cell. Alternatively, the MAC CE could contain an offset for the second TRP (Offset_1). The offset could be (UL) timing advance difference between TRP1 and TRP2. The UE could apply the TAC_TRP1 to the serving cell (or to the cell associated with TRP1) and apply TAC_TRP2 to the non-serving cell (or apply Offset_1 and/or TAC_TRP1 to the non-serving cell).

To derive Timing Advance for the second TRP, TA2, based on the Offset_1, for instance, the UE could add the Offset_1 to a current (or previous) Timing Advance (before applying TAC_TRP1), TA1, of the first TRP (e.g., TA2=TA1+Offset_1). For another instance, the UE could add the Offset_1 to a Timing Advance of the first TRP, TA1', which is derived based on the current (or previous) Timing Advance, TA1, applying the TAC_TRP1 indicated in the TAC MAC CE (e.g., TA2=TA1+TAC_TRP1+Offset_1).

Additionally and/or alternatively, as shown in FIG. 15B, the MAC CE could contain a non-serving cell ID, Non-serving cell id1 (e.g., a PCI of the non-serving cell), and the UE applies the Offset1 or TAC_TRP2 (an absolute TA value or a relative TA value for adjusting current TA) to the non-serving cell associated with Non-serving cell id1.

Additionally and/or alternatively, as shown in FIG. 15C, the MAC CE could contain more than one offsets or TACs for non-serving cells. The MAC CE could indicate TAC_TRP1 (for a serving cell). The MAC CE could indicate two Offsets or TACs for two non-serving cells e.g., (with PCI non-serving cell id1 and id2), and the UE applies the Offset_1, Offset_2 or (TAC_TRP2, TAC_TRP3, absolute TA values or relative TA values for adjusting current TAs)) to the indicated non-serving cells.

Additionally and/or alternatively, as shown in FIG. 15D, the MAC CE could contain more than one offsets or TACs for non-serving cells. The MAC CE may not contain TAG ID field nor contain TA command for serving cells. The MAC CE could indicate two Offsets or TACs for two non-serving cells e.g., (with PCI non-serving cell id1 and id2), and the UE applies the Offset_1, Offset_2 or (TAC_TRP2, TAC_TRP3, absolute TA values or relative TA values for adjusting current TAs)) to the indicated non-serving cells.

Alternatively, the network could provide TA of the first TRP and the second TRP for the UE via a PDCCH signaling (e.g., DCI) instead of a MAC CE.

Any combination of the below concepts, teachings, or embodiments can be jointly combined with the embodiments and disclosure above and herein or formed to a new embodiment.

For a TA information associated with a TRP, the UE could apply the TA information (e.g., derive $N_{TA}$ and/or $N_{TA,offset}$) or derive time difference between UL and DL of the TRP based on or using the TA information.

For a TRP associated with a Cell, the TRP could be indicated or associated with a coresetpool index of the Cell. Additionally and/or alternatively, the TRP could be indicated or could be associated with one or more TCI state(s) or SRS resource set(s) or BFD-RS or spatial relation info which are configured for the Cell. Additionally and/or alternatively, for a TRP associated with a Cell, the TRP could be associated with a physical cell index or serving Cell index of the Cell.

To activate a TRP for a UE, the network could activate TCI state(s) of the UE which is associated with the TRP. To activate the TRP for the UE for UL transmission, the network could activate UL beam(s) or UL TCI state(s) or spatial relation info associated with the TRP (e.g., UL beams for performing PUCCH, PUSCH transmissions).

The first TRP is not synchronous with the second TRP. The first TRP could have a different TA information with the second TRP. The Serving Cell is not synchronous with the non-Serving Cell. The Serving Cell could have a different TA information with the non-Serving Cell. For a UE performing mTRP operation on a first TRP and a second TRP, the UE transmits a transport block (TB) to the first TRP (repetition of) and the same TB to the second TRP. Additionally and/or alternatively, the UE could receive a second TB on the first TRP and the same second TB on the second TRP. The first TRP and the second TRP could be associated with a same Cell (intra-Cell mTRP) or different Cells (inter-Cell mTRP). The UE could perform UL transmissions to one or more TRPs via multiple panels of the UE (e.g., one UL panel corresponds to one TRP for UL transmission). Each of the one or more TRPs could be associated with a Cell. The UE performing mTRP operation could activate more than one TCI states (or spatial relation info) (at the same time), wherein each of the more than one TCI state(s) (or spatial relation info) could be associated with the first TRP or the second TRP. The UE could perform UL or DL communication with the first TRP and the second TRP via the more than one activated TCI states (or spatial relation info).

Each of the more than one TCI states could be associated with a PUSCH or a PUCCH, wherein the UE could perform multiple PUCCH and/or PUSCH transmissions to the first and second TRP via the more than one TCI states (or spatial relation info).

A TRP mentioned above could be replaced by or could be associated with a CORESET Pool (e.g., a coresetPoolIndex) of a Cell. For a UE performing single TRP operation on a Cell, the UE could receive, monitor signaling from the cell via a single CORESET pool. For a UE performing multi-TRP operation on a Cell, the UE could receive, monitor signaling from the cell via more than one CORESET pools.

Additionally and/or alternatively, the TRP mentioned above could be replaced by or could be associated with one or more TCI states of a Cell. For a UE performing single TRP operation on a Cell, the UE could receive or monitor signaling on the cell via one activated TCI state. For a UE performing multi-TRP operation on a Cell, the UE could receive or monitor signaling via more than one activated TCI state(s). Additionally and/or alternatively, the TRP mentioned above could be replaced by or could be associated with an index of a SRS resource.

Additionally and/or alternatively, the TRP mentioned above could be replaced by or could be associated with a SRS resource (set) of a Cell. For a UE performing single TRP operation on a Cell, the UE could transmit SRS on the cell via one SRS resource. For a UE performing multi-TRP operation on a Cell, the UE could transmit SRS via more than one SRS resource(s), wherein each of the more than one SRS resource(s) could be associated with a (different) TRP.

The TCI state(s) or spatial relation info could be associated with or indicate a beam or reference signal (e.g., a Synchronization Signal Block (SSB) or a Channel State Information Reference Signal (CSI-RS)).

Additionally and/or alternatively, the TRP mentioned above could be replace by or could be associated with PUSCH or PUCCH. For a UE performing intra-cell mTRP operation on a Cell, the UE could perform UL transmission via more than one PUSCH associated with the Cell. For a UE performing inter-cell mTRP operation on a Cell, the UE could perform UL transmissions via more than one PUSCH associated with different Cells, wherein the UL transmissions could contain transmitting a same TB on different PUSCHs associated with different Cells.

Additionally and/or alternatively, the TRP mentioned above could be replaced by or could be associated with a set of (UL) beam(s) of a Cell. For a UE performing single TRP operation on a Cell, the UE could perform UL transmission via one set of (UL) beam(s). For a UE performing multi-TRP operation on a Cell, the UE could perform UL transmission via more than one set of (UL) beam(s), wherein each of the more than one set of (UL) beam(s) could be associated with a (different) TRP.

Additionally and/or alternatively, the TRP mentioned above could be replaced by or could be associated with a spatial relation info of a Cell. For a UE performing single TRP operation on a Cell, the UE could activate one spatial relation info (of the Cell). For a UE performing multi-TRP operation on a Cell, the UE could activate more than one spatial relation info (of the Cell), wherein each of the more than one spatial relation info could be associated with a (different) TRP.

A non-serving cell of a UE could be configured with/associated with a PCI value different from PCI values of Serving Cells of the UE. A non-serving Cell could be a neighboring Cell of the UE.

The TA information associated with the second TRP (provided by the network) could contain a (absolute) Timing Advance command (e.g., a $T_A$) or a $N_{TA}$ (e.g., Timing Advance between downlink and uplink) for timing adjustment for UL transmission on the second TRP.

For example, the TA information associated with the second TRP could be a Timing Advance command $T_A$ with value range from 0 to 3846, where an amount of the time alignment for the second TRP with sub-carrier spacing (SCS) of $2^\mu \cdot 0.15$ KHz is $N_{TA} = T_A \cdot 16 \cdot 64/2^\mu$. Additionally and/or alternatively, the TA information associated with the second TRP could be a Timing Advance command $T_A$ in the form of an index (range from 0 to 63). The UE could adjust a current $N_{TA}$ value to a new $N_{TA}$ value based on the $T_A$, wherein for a TRP with SCS of $2^\mu \cdot 0.15$ KHZ, $N_{TA\_new} = N_{TA\_old} + (T_A - 31) \cdot 16 \cdot 64/2^\mu$.

Alternatively, the TA information associated with the second TRP could contain $N_{TA}$ associated with the first TRP and/or a (slot) offset associated with the $N_{TA}$ associated with the first TRP. When the (slot) offset equals to 0, the first TRP and the second TRP has the same Timing Advance, or TA, for UL transmission.

Alternatively, the TA information associated with the second TRP could indicate or contain a cell index of the second TRP or indicate the second TRP. The UE could apply the TA information to the second TRP.

The TA information could be UL TA information containing Timing Advance between downlink and uplink (e.g., a $N_{TA}$) and/or a fixed offset used to calculate the Timing Advance (e.g., a $N_{TA,offset}$).

The activation signaling of a TRP could be a TCI state activation/deactivation MAC CE or spatial relation info activation/deactivation MAC CE.

The activation signaling of a TRP could be a DCI indicating activation/deactivation of a TCI state. The DCI may not contain nor indicate a UL grant or a DL assignment (e.g., a beam indication DCI). The activation signaling of a TRP could be a DCI or MAC CE indicating activation/deactivation of spatial relation info.

The PDCCH signaling could be a (new format of) PDCCH order. The PDCCH signaling could indicate a Cell id (e.g., PCI) and/or a beam (e.g., TCI state id) and/or TRP id (e.g., BFD-RS set(s) id) for the (first and/or second) TRP. In response to completion of the random access procedure on the non-Serving Cell, the UE could perform SRS transmission on the Cell. The UE may not perform SRS transmission (even if SRS resource is configured for the non-Serving Cell) before obtaining TA information of the non-Serving Cell.

The first TRP is not synchronous with the second TRP. The first TRP could have a different TA information with the second TRP. The Serving Cell is not synchronous with the non-Serving Cell. The Serving Cell could have a different TA information with the non-Serving Cell.

The TCI states activation MAC CE could be TCI State Indication for UE-specific PDCCH MAC CE.

The TCI states activation MAC CE could be TCI States Activation/Deactivation for UE-specific PDSCH MAC CE.

The first TRP and the second TRP may not be in the same TAG.

The PDCCH signaling could be a PDCCH order. The PDCCH signaling could be a DCI format different from a PDCCH order.

The random access procedure could be a contention-based or contention-free random access procedure.

For a TA information associated with a TRP, a UE could maintain a timer for the TA information. The TA information is considered valid when the timer is running. The TA information is considered invalid when the timer expires or is not running. The UE could (re)start the timer of a TA information of a TRP (and does not restart timer of TA information of other TRPs) if or when receiving a Timing Advance command (via a MAC CE) of the TA information of the TRP.

Any combination of above concepts can be jointly combined or formed to a new embodiment. The following embodiments can be used to solve at least (but not limited to) the issue mentioned above.

Figure 16:
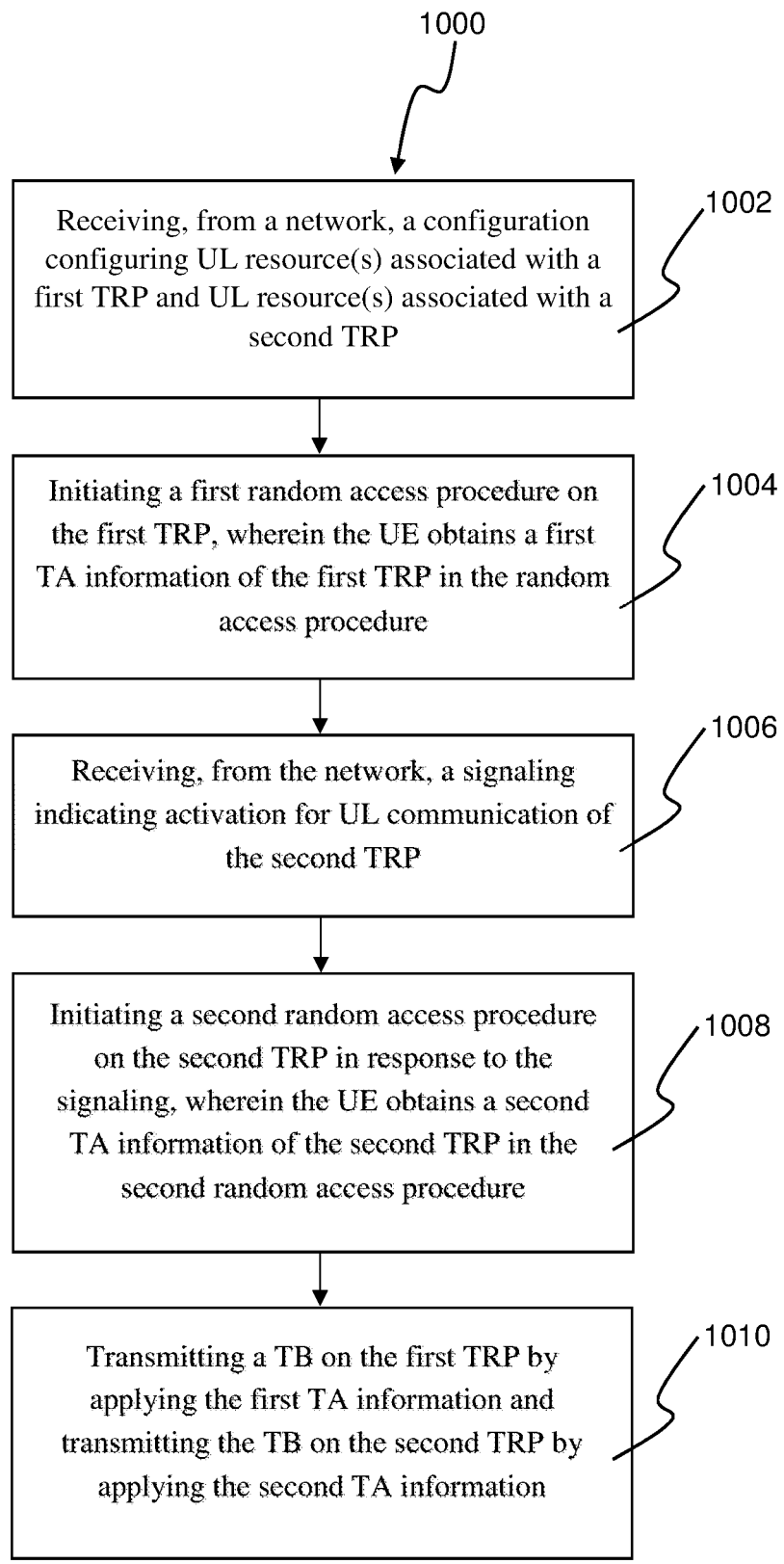
FIG. 16 is a flow diagram of a method of a UE receiving, from a network, a configuration configuring UL resource(s) associated with a first TRP and UL resource(s) associated with a second TRP, in accordance with embodiments of the present invention.

Referring to FIG. 16, with this and other concepts, systems, and methods of the present invention, a method 1000 for a UE in a wireless communication system comprises receiving, from a network, a configuration configuring UL resource(s) associated with a first TRP and UL resource(s) associated with a second TRP (step 1002), initiating a first random access procedure on the first TRP, wherein the UE obtains a first TA information of the first TRP in the random access procedure (step 1004), receiving, from the network, a signaling indicating activation for UL communication of the second TRP (step 1006), initiating a second random access procedure on the second TRP in response to the signaling, wherein the UE obtains a second TA information of the second TRP in the second random access procedure (step 1008), and transmitting a TB on the first TRP by applying the first TA information and transmitting the TB on the second TRP by applying the second TA information (step 1010).

In various embodiments, the UE is configured with multi-TRP operation on the first TRP and the second TRP.

In various embodiments, the first TRP is associated with a serving cell.

In various embodiments, the second TRP is associated with a serving cell same as the first TRP.

In various embodiments, the second TRP is associated with a non-Serving Cell.

In various embodiments, the UE does not consider the non-Serving Cell to be a Serving Cell in response to completion of the second random access procedure.

In various embodiments, the first and/or second TA information is a Timing Advance command for the first and/or second TRP.

In various embodiments, the first and/or second TA information is a time alignment, or a Timing Advance ($N_{TA}$) between downlink and uplink of the first and/or second TRP.

In various embodiments, the UE does not perform the second random access procedure to the second TRP when or if a TA information associated with the second TRP has been provided by the network in the configuration.

In various embodiments, the UE does not perform the second random access procedure to the second TRP when or if the TA information associated with the second TRP has been provided by the network in the signaling or before receiving the signaling.

In various embodiments, the UE initiates the first random access procedure in response to a PDCCH order from the network.

In various embodiments, the UE initiates the first random access procedure in response to connection establishment triggered by the UE.

In various embodiments, the signaling is an activation MAC CE activating TCI state(s) associated with the second TRP.

In various embodiments, the signaling is a PDCCH signaling indicating mTRP operation.

In various embodiments, the signaling indicates or provides a PCI.

In various embodiments, the signaling indicates a serving cell index.

In various embodiments, the signaling indicates one or more TCI state(s) (e.g., TCI state(s) ID).

Referring back to FIGS. 3 and 4, in one or more embodiments from the perspective of a UE, the device 300 includes a program code 312 stored in memory 310 of the transmitter. The CPU 308 could execute program code 312 to: (i) receive, from a network, a configuration configuring UL resource(s) associated with a first TRP and UL resource(s) associated with a second TRP, (ii) initiate a first random access procedure on the first TRP, wherein the UE obtains a first TA information of the first TRP in the random access procedure, (iii) receive, from the network, a signaling indicating activation for UL communication of the second TRP, (iv) initiate a second random access procedure on the second TRP in response to the signaling, wherein the UE obtains a second TA information of the second TRP in the second random access procedure, and (v) transmit a TB on the first TRP by applying the first TA information and transmitting the TB on the second TRP by applying the second TA information. Moreover, the CPU 308 can execute the program code 312 to perform all of the described actions, steps, and methods described above, below, or otherwise herein.

Figure 17:
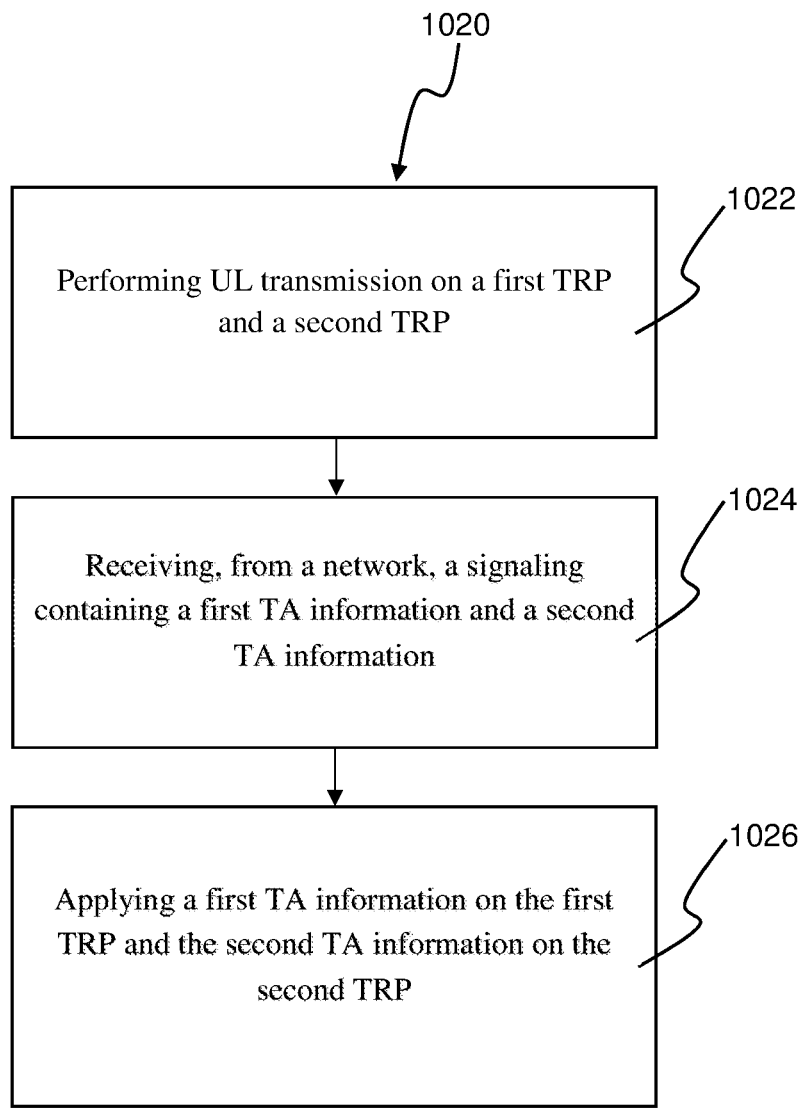
FIG. 17 is a flow diagram of a method of a UE performing UL transmission on a first TRP and a second TRP, in accordance with embodiments of the present invention.

Referring to FIG. 17, with this and other concepts, systems, and methods of the present invention, a method 1020 for a UE in a wireless communication system comprises performing UL transmission on a first TRP and a second TRP (step 1022), receiving, from a network, a signaling containing a first TA information and a second TA information (step 1024), and applying a first TA information on the first TRP and the second TA information on the second TRP (step 1026).

In various embodiments, the first TRP and the second TRP are in different Timing Advance Group (TAG).

In various embodiments, the first TRP and the second TRP are in the same TAG.

In various embodiments, the first and/or second TA information is a Timing Advance command for the first and/or second TRP.

In various embodiments, the first and/or second TA information is a time alignment, or a Timing Advance ($N_{TA}$) between downlink and uplink of the first and/or second TRP.

In various embodiments, the second TA information is an offset between Timing Advance of the first TRP and the Timing Advance of the second TRP.

In various embodiments, the first TRP is associated with a serving cell.

In various embodiments, the second TRP is associated with a serving cell same as the first TRP.

In various embodiments, the second TRP is associated with a non-Serving Cell and the first TRP is associated with a Serving Cell.

In various embodiments, the UE performs inter-cell mTRP operation on the non-serving cell and the serving cell.

In various embodiments, the signaling is a MAC CE.

In various embodiments, the signaling contains a physical cell id associated with the second TRP.

Referring back to FIGS. 3 and 4, in one or more embodiments from the perspective of a UE, the device 300 includes a program code 312 stored in memory 310 of the transmitter. The CPU 308 could execute program code 312 to: (i) perform UL transmission on a first TRP and a second TRP, (ii) receive, from a network, a signaling containing a first time alignment TA information and a second TA information, and (iii) apply a first TA information on the first TRP and the second TA information on the second TRP (step 1024). Moreover, the CPU 308 can execute the program code 312 to perform all of the described actions, steps, and methods described above, below, or otherwise herein.

Figure 18:
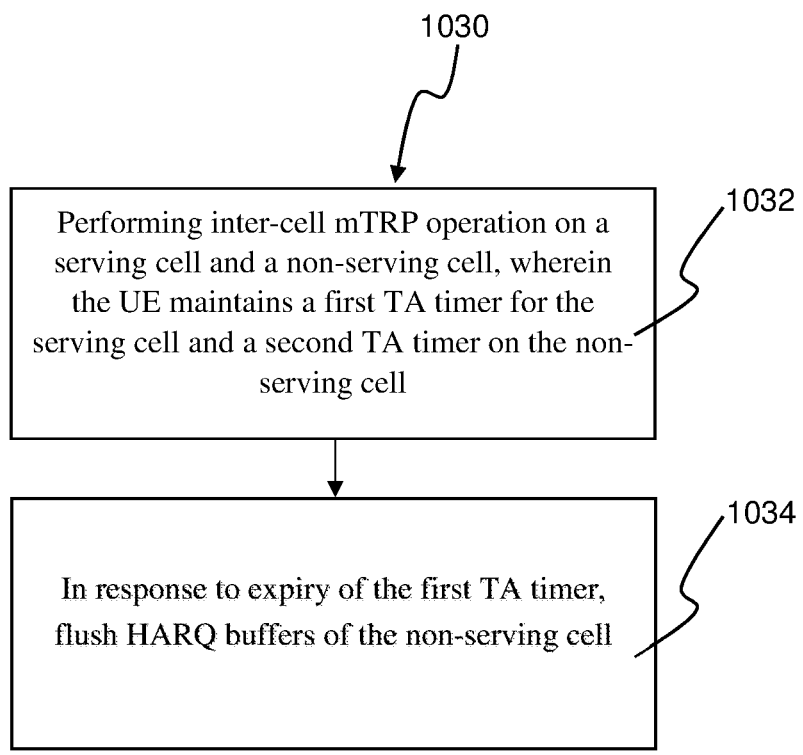
FIG. 18 is a flow diagram of a method of a UE performing inter-cell mTRP operation on a serving cell and a non-serving cell, in accordance with embodiments of the present invention.

Referring to FIG. 18, with this and other concepts, systems, and methods of the present invention, a method 1030 for a UE in a wireless communication system comprises performing inter-cell mTRP operation on a serving cell and a non-serving cell, wherein the UE maintains a first TA timer for the serving cell and a second TA timer on the non-serving cell (step 1032), and in response to expiry of the first TA timer, flush HARQ buffers of the non-serving cell (step 1034).

In various embodiments, the second TA timer is not expired when the first TA timer expired.

In various embodiments, the UE does not consider the second TA timer expired when the first TA timer expired.

In various embodiments, the UE flushes HARQ buffers of the serving cell and the non-serving cell in response to expiry of the first TA timer.

In various embodiments, the UE releases PUCCH for the non-serving cell in response to expiry of the first TA timer.

In various embodiments, the UE clears PUSCH resource for CSI reporting for the non-serving cell in response to expiry of the first TA timer.

In various embodiments, the UE clears configured DL assignments and UL grants for the non-serving cell in response to expiry of the first TA timer.

In various embodiments, the serving cell and the non-serving cell are in different TAGs.

In various embodiments, the serving cell and the non-serving cell are in the same TAG.

In various embodiments, the UE maintain a first $N_{TA}$ for the serving cell and a second $N_{TA}$ for the non-serving cell.

Referring back to FIGS. 3 and 4, in one or more embodiments from the perspective of a UE, the device 300 includes a program code 312 stored in memory 310 of the transmitter. The CPU 308 could execute program code 312 to: (i) perform inter-cell mTRP operation on a serving cell and a non-serving cell, wherein the UE maintains a first TA timer for the serving cell and a second TA timer on the non-serving cell, and (ii) in response to expiry of the first TA timer, flush HARQ buffers of the non-serving cell. Moreover, the CPU 308 can execute the program code 312 to perform all of the described actions, steps, and methods described above, below, or otherwise herein.

Figure 19:
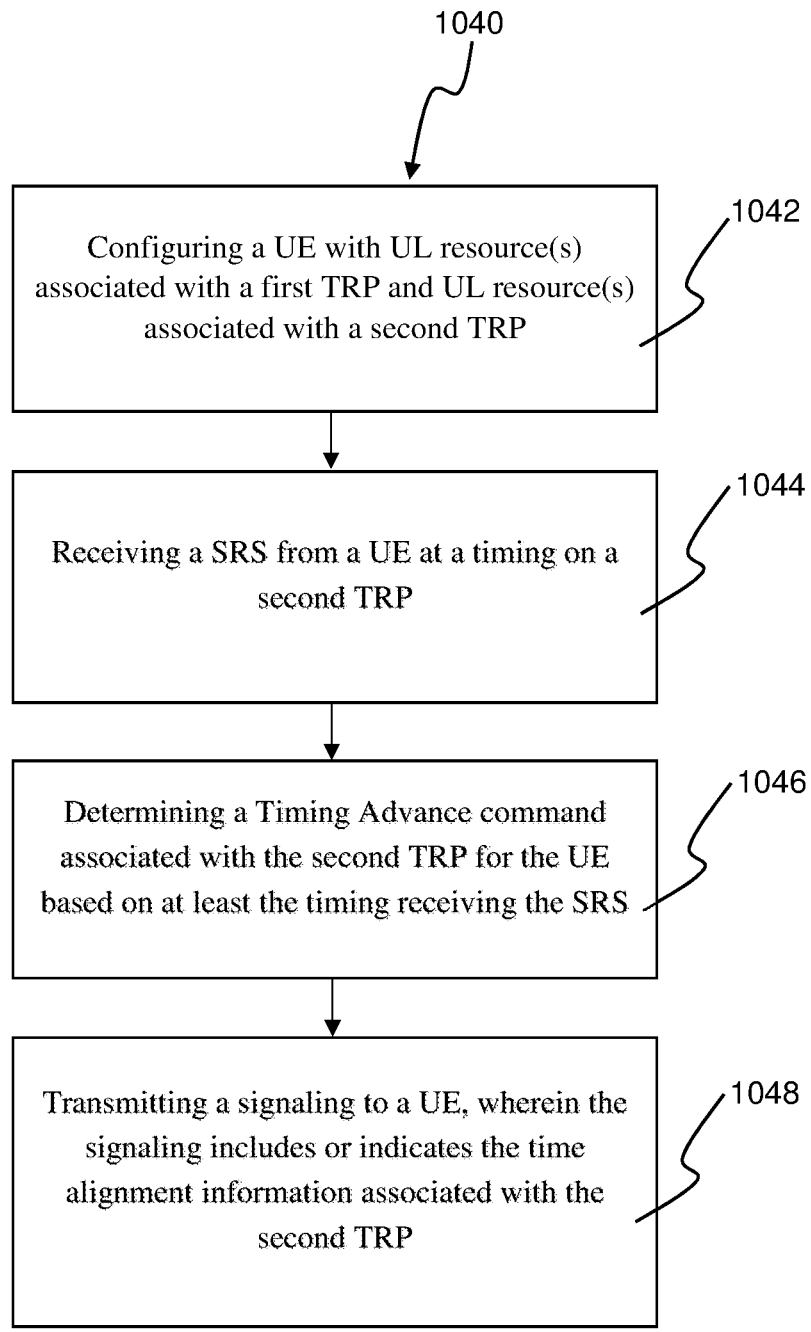
FIG. 19 is a flow diagram of a method of a network configuring a UE with UL resource(s) associated with a first TRP and UL resource(s) associated with a second TRP, in accordance with embodiments of the present invention.

Referring to FIG. 19, with this and other concepts, systems, and methods of the present invention, a method 1040 for a network in a wireless communication system comprises configuring a UE with UL resource(s) associated with a first TRP and UL resource(s) associated with a second TRP (step 1042), receiving a SRS from a UE at a timing on a second TRP (step 1044), determining a Timing Advance command associated with the second TRP for the UE based on at least the timing receiving the SRS (step 1046), and transmitting a signaling to a UE, wherein the signaling includes or indicates the time alignment information associated with the second TRP (step 1048).

In various embodiments, the network determines the Timing Advance command further based on time alignment information associated with a first TRP.

In various embodiments, the UE transmits the SRS at the timing based on a time alignment associated with the first TRP.

In various embodiments, the time alignment information associated with the second TRP is an offset associated with time alignment associated with the first TRP.

In various embodiments, a time alignment associated with the second TRP of the UE is the time alignment associated with the first TRP plus or minus the offset.

In various embodiments, the signaling contains an activation of the second TRP, wherein the UE activates UL transmission via the second TRP in response to the signaling.

In various embodiments, the time alignment information associated with the second TRP is a Timing Advance command for the second TRP.

In various embodiments, the time alignment information associated with the second TRP is a time alignment, or a Timing Advance ($N_{TA}$) between downlink and uplink of the second TRP.

In various embodiments, the UE performs multi-TRP operation on the first TRP and the second TRP.

In various embodiments, the first TRP and the second TRP are associated with different Cells.

In various embodiments, the first TRP and the second TRP are associated with a same Cell.

In various embodiments, the UE obtains time alignment associated with the first TRP via a random access procedure.

In various embodiments, the UE does not obtain the time alignment associated with the second TRP via a random access procedure.

Referring back to FIGS. 3 and 4, in one or more embodiments from the perspective of a network, the device 300 includes a program code 312 stored in memory 310 of the transmitter. The CPU 308 could execute program code 312 to: (i) configure a UE with UL resource(s) associated with a first TRP and UL resource(s) associated with a second TRP, (ii) receive a SRS from a UE at a timing on a second TRP, (iii) determine a Timing Advance command associated with the second TRP for the UE based on at least the timing receiving the SRS, and (iv) transmit a signaling to a UE, wherein the signaling includes or indicates the time alignment information associated with the second TRP. Moreover, the CPU 308 can execute the program code 312 to perform all of the described actions, steps, and methods described above, below, or otherwise herein.

Figure 20:
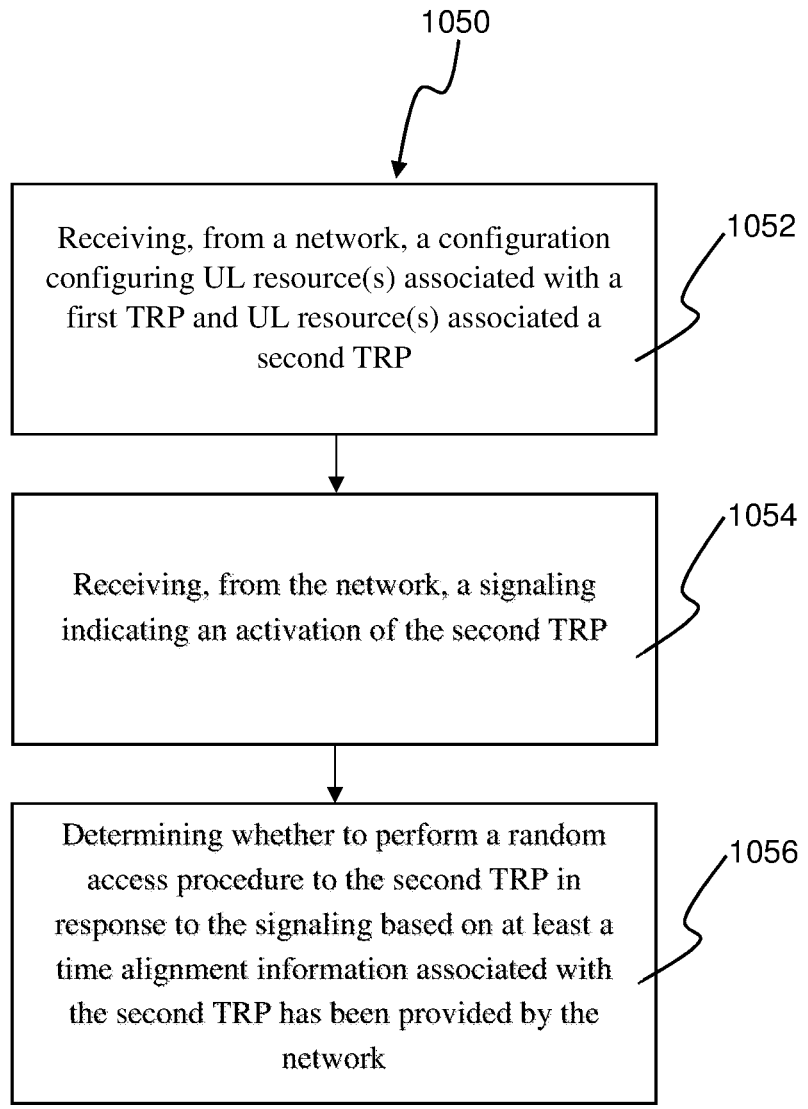
FIG. 20 is a flow diagram of a method of a UE receiving, from a network, a configuration configuring UL resource(s) associated with a first TRP and UL resource(s) associated a second TRP, in accordance with embodiments of the present invention.

Referring to FIG. 20, with this and other concepts, systems, and methods of the present invention, a method 1050 for a UE in a wireless communication system comprises receiving, from a network, a configuration configuring UL resource(s) associated with a first TRP and UL resource(s) associated a second TRP (step 1052), receiving, from the network, a signaling indicating an activation of the second TRP (step 1054), and determining whether to perform a random access procedure to the second TRP in response to the signaling based on at least a time alignment information associated with the second TRP has been provided by the network (step 1056).

In various embodiments, the UE does not perform a random access procedure to the second TRP when or if a time alignment information associated with the second TRP has been provided by the network (in the signaling).

In various embodiments, the UE does not perform a random access procedure to the second TRP when or if the time alignment information associated with the second TRP has been provided by the network in the signaling.

In various embodiments, the UE does not perform a random access procedure to the second TRP when or if the time alignment information associated with the second TRP has been provided by the network via a previous signaling before the signaling.

In various embodiments, the UE does not perform a random access procedure to the second TRP when or if the time alignment information associated with the second TRP has been provided by the network in the configuration.

In various embodiments, the UE performs a random access procedure to the second TRP when or if a time alignment information associated with the second TRP has not been provided by the network.

In various embodiments, the UE determines whether to perform a random access procedure to the second TRP further based on whether random access resources is provided (via the configuration) for the second TRP.

In various embodiments, the UE performs a random access procedure to the second TRP when or if random access resources is provided (via the configuration) for the second TRP.

In various embodiments, the UE does not perform a random access procedure to the second TRP when or if random access resources is not provided (via the configuration) for the second TRP.

In various embodiments, the UE performs multi-TRP operation on the first TRP and the second TRP.

In various embodiments, the first TRP and the second TRP are associated with different Cells.

In various embodiments, the first TRP and the second TRP are associated with a same Cell.

In various embodiments, the time alignment information associated with the second TRP is a Timing Advance command for the second TRP.

In various embodiments, the time alignment information associated with the second TRP is a time alignment, or a Timing Advance ($N_{TA}$) between downlink and uplink of the second TRP.

In various embodiments, the time alignment information associated with the second TRP is an offset associated with time alignment associated with the first TRP.

Referring back to FIGS. 3 and 4, in one or more embodiments from the perspective of a UE, the device 300 includes a program code 312 stored in memory 310 of the transmitter. The CPU 308 could execute program code 312 to: (i) receive, from a network, a configuration configuring UL resource(s) associated with a first TRP and UL resource(s) associated a second TRP, (ii) receive, from the network, a signaling indicating an activation of the second TRP, and (iii) determine whether to perform a random access procedure to the second TRP in response to the signaling based on at least a time alignment information associated with the second TRP has been provided by the network. Moreover, the CPU 308 can execute the program code 312 to perform all of the described actions, steps, and methods described above, below, or otherwise herein.

Figure 21:
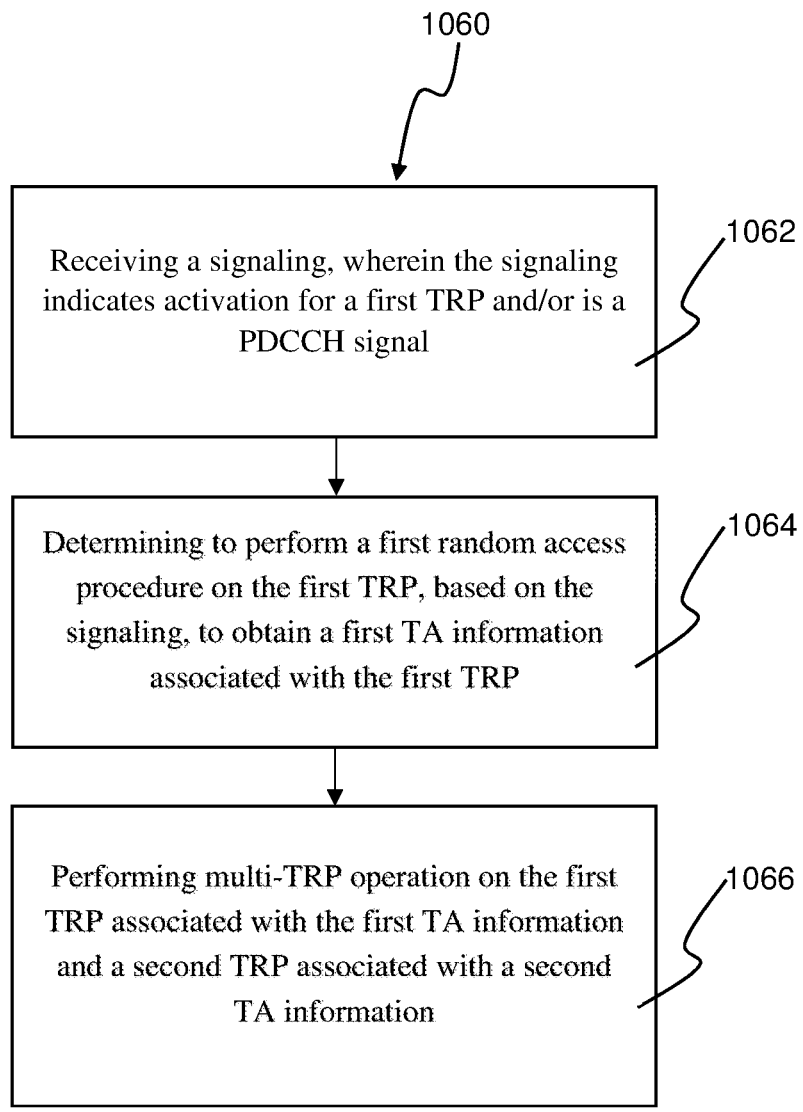
FIG. 21 is a flow diagram of a method of a UE receiving a signaling, wherein the signaling indicates activation for a first TRP and/or is a PDCCH signal, in accordance with embodiments of the present invention.

Referring to FIG. 21, with this and other concepts, systems, and methods of the present invention, a method 1060 for a UE in a wireless communication system comprises receiving a signaling, wherein the signaling indicates activation for a first TRP and/or is a PDCCH signal (step 1062), determining to perform a first random access procedure on the first TRP, based on the signaling, to obtain a first TA information associated with the first TRP (step 1064), and performing multi-TRP operation on the first TRP associated with the first TA information and a second TRP associated with a second TA information (step 1066).

In various embodiments, the method further comprises determining to not perform the first random access procedure if the time alignment timer associated with the first TRP is running.

In various embodiments, the method further comprises obtaining the second TA information in a second random access procedure on the second TRP.

In various embodiments, the first TRP and the second TRP are associated with different TAGs.

In various embodiments, the activation for the first TRP is to activate a TCI state or a spatial relation info associated with the first TRP.

In various embodiments, the first TRP and the second TRP are TRPs of a same serving cell of the UE.

In various embodiments, the second TRP is a TRP of a serving cell of the UE and the first TRP is associated with a PCI different from PCI values of serving cells of the UE.

In various embodiments, the first TA information is a Timing Advance between downlink and uplink of the first TRP and the second TA information is a Timing Advance between downlink and uplink of the second TRP.

In various embodiments, the signaling indicates or provides information of a PCI and/or a coresetpool index and/or a BFD-RS set associated with the first TRP.

In various embodiments, the signaling indicates one or more TCI states and/or one or more SRS resource set identities and/or one or more spatial relation info associated with the first TRP.

In various embodiments, the signaling indicates whether to obtain the first TA information associated with the first TRP.

In various embodiments, the signaling indicates whether to perform the first random access procedure.

In various embodiments, the method further comprises performing UL transmission on the first TRP by applying the first TA information and performing UL transmission on the second TRP by applying the second TA information.

In various embodiments, the first random access procedure is contention-free or contention-based.

Referring back to FIGS. 3 and 4, in one or more embodiments from the perspective of a UE, the device 300 includes a program code 312 stored in memory 310 of the transmitter. The CPU 308 could execute program code 312 to: (i) receive a signaling, wherein the signaling indicates activation for a first TRP and/or is a PDCCH signal, (ii) determine to perform a first random access procedure on the first TRP, based on the signaling, to obtain a first TA information associated with the first TRP, and (iii) perform multi-TRP operation on the first TRP associated with the first TA information and a second TRP associated with a second TA information. Moreover, the CPU 308 can execute the program code 312 to perform all of the described actions, steps, and methods described above, below, or otherwise herein.

Any combination of the above concepts or teachings can be jointly combined or formed to a new embodiment. The disclosed details and embodiments can be used to solve at least (but not limited to) the issues mentioned above and herein.

It is noted that any of the methods, alternatives, steps, examples, and embodiments proposed herein may be applied independently, individually, and/or with multiple methods, alternatives, steps, examples, and embodiments combined together.

Various aspects of the disclosure have been described above. It should be apparent that the teachings herein may be embodied in a wide variety of forms and that any specific structure, function, or both being disclosed herein is merely representative. Based on the teachings herein one skilled in the art should appreciate that an aspect disclosed herein may be implemented independently of any other aspects and that two or more of these aspects may be combined in various ways. For example, an apparatus may be implemented or a method may be practiced using any number of the aspects set forth herein. In addition, such an apparatus may be implemented or such a method may be practiced using other structure, functionality, or structure and functionality in addition to or other than one or more of the aspects set forth herein. As an example of some of the above concepts, in some aspects, concurrent channels may be established based on pulse repetition frequencies. In some aspects, concurrent channels may be established based on pulse position or offsets. In some aspects, concurrent channels may be established based on time hopping sequences. In some aspects, concurrent channels may be established based on pulse repetition frequencies, pulse positions or offsets, and time hopping sequences.

Those of ordinary skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of ordinary skill in the art would further appreciate that the various illustrative logical blocks, modules, processors, means, circuits, and algorithm steps described in connection with the aspects disclosed herein may be implemented as electronic hardware (e.g., a digital implementation, an analog implementation, or a combination of the two, which may be designed using source coding or some other technique), various forms of program or design code incorporating instructions (which may be referred to herein, for convenience, as "software" or a "software module"), or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

In addition, the various illustrative logical blocks, modules, and circuits described in connection with the aspects disclosed herein may be implemented within or performed by an integrated circuit ("IC"), an access terminal, or an access point. The IC may comprise a general purpose processor, a digital signal processor (DSP), an application specific integrated circuit (ASIC), a field programmable gate array (FPGA) or other programmable logic device, discrete gate or transistor logic, discrete hardware components, electrical components, optical components, mechanical components, or any combination thereof designed to perform the functions described herein, and may execute codes or instructions that reside within the IC, outside of the IC, or both. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

It is understood that any specific order or hierarchy of steps in any disclosed process is an example of a sample approach. Based upon design preferences, it is understood that the specific order or hierarchy of steps in the processes may be rearranged while remaining within the scope of the present disclosure. The accompanying method claims present elements of the various steps in a sample order, and are not meant to be limited to the specific order or hierarchy presented.

The steps of a method or algorithm described in connection with the aspects disclosed herein may be embodied directly in hardware, in a software module executed by a processor, or in a combination of the two. A software module (e.g., including executable instructions and related data) and other data may reside in a data memory such as RAM memory, flash memory, ROM memory, EPROM memory, EEPROM memory, registers, a hard disk, a removable disk, a CD-ROM, or any other form of computer-readable storage medium known in the art. A sample storage medium may be coupled to a machine such as, for example, a computer/processor (which may be referred to herein, for convenience, as a "processor") such the processor can read information (e.g., code) from and write information to the storage medium. A sample storage medium may be integral to the processor. The processor and the storage medium may reside in an ASIC. The ASIC may reside in user equipment. In the alternative, the processor and the storage medium may reside as discrete components in user equipment. Moreover, in some aspects, any suitable computer-program product may comprise a computer-readable medium comprising codes relating to one or more of the aspects of the disclosure. In some aspects, a computer program product may comprise packaging materials.

While the invention has been described in connection with various aspects and examples, it will be understood that the invention is capable of further modifications. This application is intended to cover any variations, uses or adaptation of the invention following, in general, the principles of the invention, and including such departures from the present disclosure as come within the known and customary practice within the art to which the invention pertains.

What is claimed is:

1. A method of a User Equipment (UE), comprising:
    receiving a Physical Downlink Control Channel (PDCCH) signal, wherein the PDCCH signal indicates or provides information of a Physical Cell Identity (PCI);
    determining to perform a first random access procedure on a first Transmission/Reception Point (TRP), based on the PDCCH signal, to obtain or derive a first Time Alignment (TA) information associated with the first TRP, wherein the first TRP is associated with the PCI different from PCIs of serving cells of the UE; and
    performing multi-TRP operation on the first TRP associated with the first TA information and a second TRP associated with a second TA information, wherein the second TRP is a TRP of a serving cell of the UE, and wherein different sets of $N_{TA}$ and/or $N_{TA\ offset}$ are maintained or configured for the first TA information and the second TA information.

2. The method of claim 1, further comprising receiving a Medium Access Control (MAC) Control Element (CE), wherein the MAC CE contains a Timing Advance Group (TAG) id field indicating id of a TAG and a Timing Advance Command (TAC) field indicating an absolute Timing Advance for a TRP.

3. The method of claim 1, further comprising obtaining the second TA information in a second random access procedure on the second TRP.

4. The method of claim 1, wherein the first TRP and the second TRP are associated with different TAGs.

5. The method of claim 1, wherein the first TA information is a Timing Advance between downlink and uplink of the first TRP and the second TA information is a Timing Advance between downlink and uplink of the second TRP.

6. The method of claim 1, wherein the first TRP is on a cell which is not a serving cell of the UE.

7. The method of claim 1, wherein the PDCCH signal indicates one or more Transmission Configuration Indicator (TCI) states and/or one or more Sounding Reference Signal (SRS) resource set identities and/or one or more spatial relation info associated with the first TRP.

8. A method of a User Equipment (UE), comprising:
receiving a Physical Downlink Control Channel (PDCCH) signal, wherein the PDCCH signal contains a field;
determining to perform a first random access procedure on a first Transmission/Reception Point (TRP), based on the field of the PDCCH signal, to obtain or derive a first Time Alignment (TA) information associated with the first TRP, wherein the first TRP is associated with a Physical Cell Identity (PCI) different from PCIs of serving cells of the UE; and
performing multi-TRP operation on the first TRP associated with the first TA information and a second TRP associated with a second TA information, wherein different sets of $N_{TA}$ and/or $N_{TA\ offset}$ are maintained or configured for the first TA information and the second TA information.

9. The method of claim 8, further comprising receiving a Medium Access Control (MAC) Control Element (CE), wherein the MAC CE contains a Timing Advance Group (TAG) id field indicating id of a TAG and a Timing Advance Command (TAC) field indicating an absolute Timing Advance for a TRP.

10. The method of claim 8, wherein size of the field is one bit, and/or
obtaining the second TA information in a second random access procedure on the second TRP of a serving cell of the UE, and/or
the field is used for identifying to update the second TA information or obtain the first TA information.

11. A User Equipment (UE), comprising:
a memory; and
a processor operatively connected to the memory, wherein the processor is configured to execute a program code to:
receive a Physical Downlink Control Channel (PDCCH) signal, wherein the PDCCH signal indicates or provides information of a Physical Cell Identity (PCI);
determine to perform a first random access procedure on a first Transmission/Reception Point (TRP), based on the PDCCH signal, to obtain or derive a first Time Alignment (TA) information associated with the first TRP, wherein the first TRP is associated with the PCI different from PCIs of serving cells of the UE; and
perform multi-TRP operation on the first TRP associated with the first TA information and a second TRP associated with a second TA information, wherein the second TRP is a TRP of a serving cell of the UE, and wherein different sets of $N_{TA}$ and/or $N_{TA\ offset}$ are maintained or configured for the first TA information and the second TA information.

12. The UE of claim 11, wherein the processor is further configured to execute the program code to receive a Medium Access Control (MAC) Control Element (CE), wherein the MAC CE contains a Timing Advance Group (TAG) id field indicating id of a TAG and a Timing Advance Command (TAC) field indicating an absolute Timing Advance for a TRP.

13. The UE of claim 11, wherein the first TRP and the second TRP are associated with different TAGs.

14. The UE of claim 11, wherein the first TRP is on a cell which is not a serving cell of the UE.

15. The UE of claim 11, wherein the PDCCH signal indicates one or more Transmission Configuration Indicator (TCI) states and/or one or more Sounding Reference Signal (SRS) resource set identities and/or one or more spatial relation info associated with the first TRP.

16. The method of claim 8, wherein the first TA information is a Timing Advance between downlink and uplink of the first TRP and the second TA information is a Timing Advance between downlink and uplink of the second TRP.

17. The method of claim 8, wherein the PDCCH signal indicates one or more Transmission Configuration Indicator (TCI) states and/or one or more Sounding Reference Signal (SRS) resource set identities and/or one or more spatial relation info associated with the first TRP.

18. The method of claim 8, wherein the first TRP is on a cell which is not a serving cell of the UE.

19. The UE of claim 11, wherein the processor is further configured to execute the program code to obtain the second TA information in a second random access procedure on the second TRP.

20. The UE of claim 11, wherein the first TA information is a Timing Advance between downlink and uplink of the first TRP and the second TA information is a Timing Advance between downlink and uplink of the second TRP.

* * * * *